US007401169B2

(12) United States Patent
Holbrook

(10) Patent No.: US 7,401,169 B2
(45) Date of Patent: Jul. 15, 2008

(54) COUNTER UPDATING SYSTEM USING AN UPDATE MECHANISM AND DIFFERENT COUNTER UTILIZATION MECHANISM

(75) Inventor: Hugh W. Holbrook, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 448 days.

(21) Appl. No.: 11/132,759

(22) Filed: May 18, 2005

(65) Prior Publication Data

US 2006/0265526 A1 Nov. 23, 2006

Related U.S. Application Data

(63) Continuation-in-part of application No. 10/888,643, filed on Jul. 8, 2004.

(51) Int. Cl.
*G06F 3/00* (2006.01)
*G06F 5/00* (2006.01)
*G06F 12/00* (2006.01)
*G06F 12/06* (2006.01)
*G06F 13/28* (2006.01)
*G06F 13/00* (2006.01)
*G06F 15/16* (2006.01)

(52) U.S. Cl. .......................... 710/52; 710/55; 707/204; 711/159; 711/165; 711/5; 709/234

(58) Field of Classification Search .................... 710/52
See application file for complete search history.

(56) References Cited

U.S. PATENT DOCUMENTS

| 6,055,590 | A | * | 4/2000 | Pettey et al. ................... 710/56 |
| 6,725,245 | B2 | | 4/2004 | Bucska |
| 2006/0106957 | A1 | * | 5/2006 | Chapman et al. .............. 710/46 |

* cited by examiner

*Primary Examiner*—Alford W. Kindred
*Assistant Examiner*—Brooke J Dews
(74) *Attorney, Agent, or Firm*—Trellis Intellectual Property Law Group, PC

(57) ABSTRACT

Disclosed are, inter alia, methods, apparatus, data structures, computer-readable media, and mechanisms for maintaining counters, such as in, but not limited to a packet switching system, and updating a secondary counter storage based on values of the counters and entries in an overflow buffer. Multiple counter values are stored in a counter bank. An indication of a particular counter of the multiple counters to update is received. A current value of the particular counter is updated in the counter bank, and if an overflow condition results, then an indication of the particular counter is added to an overflow buffer. Periodically each of the multiple counters is visited and corresponding values are updated in a secondary storage, and each entry is retrieved from the overflow buffer and a corresponding value is updated in the secondary storage.

23 Claims, 19 Drawing Sheets

COUNTER UPDATING SYSTEM USING AN UPDATE MECHANISM AND DIFFERENT COUNTER UTILIZATION MECHANISM

RELATED APPLICATION

This patent application is a continuation-in-part of co-pending U.S. Non-Provisional application Ser. No. 10/888,643, filed Jul. 8, 2004 entitled "Maintaining Counters And Updating A Secondary Counter Storage" to Hugh Holbrook, the disclosure of which is incorporated herein by reference in its entirety. Benefit of the Jul. 8, 2004 filing date is claimed with respect to all common subject matters.

BACKGROUND OF THE INVENTION

1. Field of Invention

This invention especially relates to communications and computer systems; and more particularly, the invention relates to maintaining counters, such as in, but not limited to a packet switching system, and updating a secondary counter storage based on values of the counters and entries in an overflow buffer.

2. Description of the Background Art

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

For example, in networking devices, it is important to maintain accurate packet and byte count counters for all traffic flowing through the device. Such counters are important for customers, for lab testing, and also for verification and debug purposes. Generally, counters must be maintained for a large number of items in a few different categories (e.g., individual routes the packets are taking, the adjacencies/next hops of the packets, etc.). It is not unusual for a network device to need to maintain counters on packets arriving at a rate of fifty million packets per second, and to have to support one million routes (e.g., one million different sets of packet and byte counters in the route category).

Many communications and computer systems keep large numbers of counters to indicate that certain events have occurred. Examples might include packets forwarded, bytes forwarded, overrate bytes, underrate bytes, etc. Externally-visible counters (e.g., those available to the system which are typically accumulated values from the counter bank counters maintained inside components, for example) typically must maintain total event counts that last for days, weeks, or even years. One frequent choice for packet processing applications is to use 64-bit externally-visible counters that are large enough to ensure that they will never wrap. These counters are typically implemented in RAM (usually DRAM or SDRAM). A corresponding counter is typically implemented in hardware and is usually much smaller than sixty-four bits, because typical special-purpose counter resources in the components are more expensive, and hence more limited than commodity system memory. In order to provide the external view of a large counter, the system software periodically reads each counter from the hardware device, adding the value read to an externally-visible counter that is stored in (cheap) system RAM.

The bit-width of the byte and packet counters in hardware are typically chosen such that, in the worse case, all counters can be visited before they overflow, assuming a particular rate at which the counters can be visited. The counter visitation rate is typically a system-dependent constant, and is typically limited by the total fraction of CPU time (or bus bandwidth in some cases) that is allocated to reading counters (and instead of performing other duties). For example, in a device with 100,000 counters, if the CPI performance may limit the rate that the counters can be read; while in other systems, the limitation might be bus bandwidth.

In implementations with the counter bank counters implemented on an application-specific integrated circuit (ASIC), it is not uncommon for the counter state to total many megabits of on-chip memory, occupying a non-trivial fraction of the total chip area. For example, one packet switch uses roughly 150,000 on-chip packet and byte counters with each counter having thirty-two bits of on-chip storage totaling 4.8 megabits of on-chip storage. Therefore, it is valuable if the on-chip storage required can be reduced while still ensuring that counters presented to the user do not wrap, and while not increasing CPU burden or bus bandwidth utilization required to read them periodically.

An issue in maintaining these counters is providing the necessary combination of storage space and bandwidth in a fashion that is cost effective, low in power, and low in pin count. Complicating the bandwidth issue is that, as the number of counters grows, the frequency at which software can reasonably read an individual counter lessens. The size and number of counters make storing the full counters directly on a packet switching chip expensive with today's technologies.

Previous solutions to the counter storage problem have addressed the cost of storage by moving the counters off-chip. This necessitates the use of expensive, high-bandwidth RAM (high-speed DDR or QDR SRAMs or DDR SDRAMS) that can keep up with the worst-case counter-update bandwidth requirements. If the packet arrival rate is fifty million packets per second, then the counter-update rate (for one type of counter) is fifty million counter updates per second in the worst case.

At a peak rate of fifty million counter updates per second, and using 128 bits to store both the byte and packet counters for one item, the bandwidth required for counter updates (which must read the old counter value and then write back an updated value) is approximately 12.8 gigabits per second. This data bandwidth could be achieved by a 64-bit wide Reduced Latency Dynamic Random Access Memory (RLDRAM) at 200 MHz, with appropriate attention to pipe-lining and bank conflicts. But this would only support one category of counter, and typical implementations have dozens of categories to maintain. As can be seen, the cost (in terms of board space, power budget, and dollars) of implementing this large a number of counters off-chip at the necessary through-put rate can be unacceptably high.

Some solutions to this problem have used FIFOs to compensate for reduced bandwidth and/or CPU activity (which can delay counter updates). These solutions have generally just used the FIFO as a buffer—the off-chip RAM is still designed for the worst-case bandwidth. (Typically, such FIFOs can hold no more than a few thousand entries, much smaller than the number of items.)

Another technique that has been used is to build two-level counters, where the least-significant bits (LSBs) and the most-significant bits (MSBs) are maintained separately. This can save bandwidth by only having to reference the MSBs when the LSBs overflow, instead of on every counter update. However, the storage required is not reduced.

Some aspects of the counter update problem are described in the article: Devarat Shah et al., *Maintaining Statistics Counters in Router Line Cards*, IEEE Micro, January-February 2002, pp. 76-81, which is hereby incorporated by reference. Shah et al. describe a theoretical approach, and a largest-counter-first counter management algorithm (LCF CMA) that selects a counter with the largest count to update to a secondary memory. This requires that some mechanism be employed to maintain counters in a sorted order or to quickly determine the largest counter. While this is a theoretically interesting approach, it is not generally practical to implement in current systems because of the cost of the sorting function. Shah et al. admit that their "LCF CMA is a complex algorithm that is hard to implement at a very high speed. It would be interesting to obtain a similar performance as LCF CMA with a less complex algorithm." Id. At 80-81.

SUMMARY OF EMBODIMENTS OF THE INVENTION

Disclosed are, inter alia, methods, apparatus, data structures, computer-readable media, and mechanisms for maintaining counters, such as in, but not limited to a packet switching system, and updating a secondary counter storage based on values of the counters and entries in an overflow buffer.

One embodiment includes a bank of multiple counters; an overflow buffer configured to store overflow indications corresponding to the counters; a counter update mechanism configured to update counters based on input values, and if updating a counter generates an overflow condition, adding an entry to the overflow buffer to identify the counter; a secondary storage for maintaining secondary counter values corresponding to multiple counters; and a secondary storage update mechanism configured to update the secondary counter values in the secondary storage. The updating of the secondary counter values typically includes: (a) for each particular counter of the multiple counters, reading and resetting a current value of the particular counter and adding its current value, at least when non-zero, to a corresponding secondary counter value in the secondary storage; and (b) for each particular entry of at least a subset of entries currently stored in the overflow buffer if the overflow buffer is not empty, retrieving the particular entry from the overflow buffer and adding a value corresponding to the overflow condition corresponding to the particular entry to a corresponding secondary counter value in the secondary storage. In one embodiment, each of the entries in the overflow buffer includes an index into the bank of the counters to identify the corresponding counter.

One embodiment maintains counters, which typically includes: updating a current value of a particular counter of multiple counters maintained in a counter bank in response to an identification of the particular counter, and if an overflow condition results, then adding an indication corresponding to the particular counter to an overflow buffer; and updating values in a secondary storage, the values corresponding to the multiple counters. The updating of the values in the secondary storage typically includes: (a) visiting each of the counters to update corresponding values in the secondary storage, and (b) retrieving one or more indications from the overflow buffer if it is not empty and updating corresponding values in the secondary storage based on the retrieved indications. In one embodiment, visiting each of the multiple counters to update corresponding values in the secondary storage includes reading and resetting each of the multiple counters. In one embodiment, updating corresponding values in the secondary storage based on retrieved entries includes adding an overflow value corresponding to the overflow condition to said corresponding values in the secondary storage.

In one embodiment, updating values in the secondary storage includes repeatedly performing iterations of the (a) operations and the (b) operations. In one embodiment, each iteration includes an equal number of times that the (a) operations are performed and the (b) operations are performed. In one embodiment, each iteration includes the (b) operations being performed more times than that of the (a) operations. In one embodiment, said (a) is accomplished by operating on different subsets of the multiple counters; and wherein said (b) is performed multiple times during said each iteration, each of said multiple times occurring after said operation on one of said different subsets.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

Figure 1A:
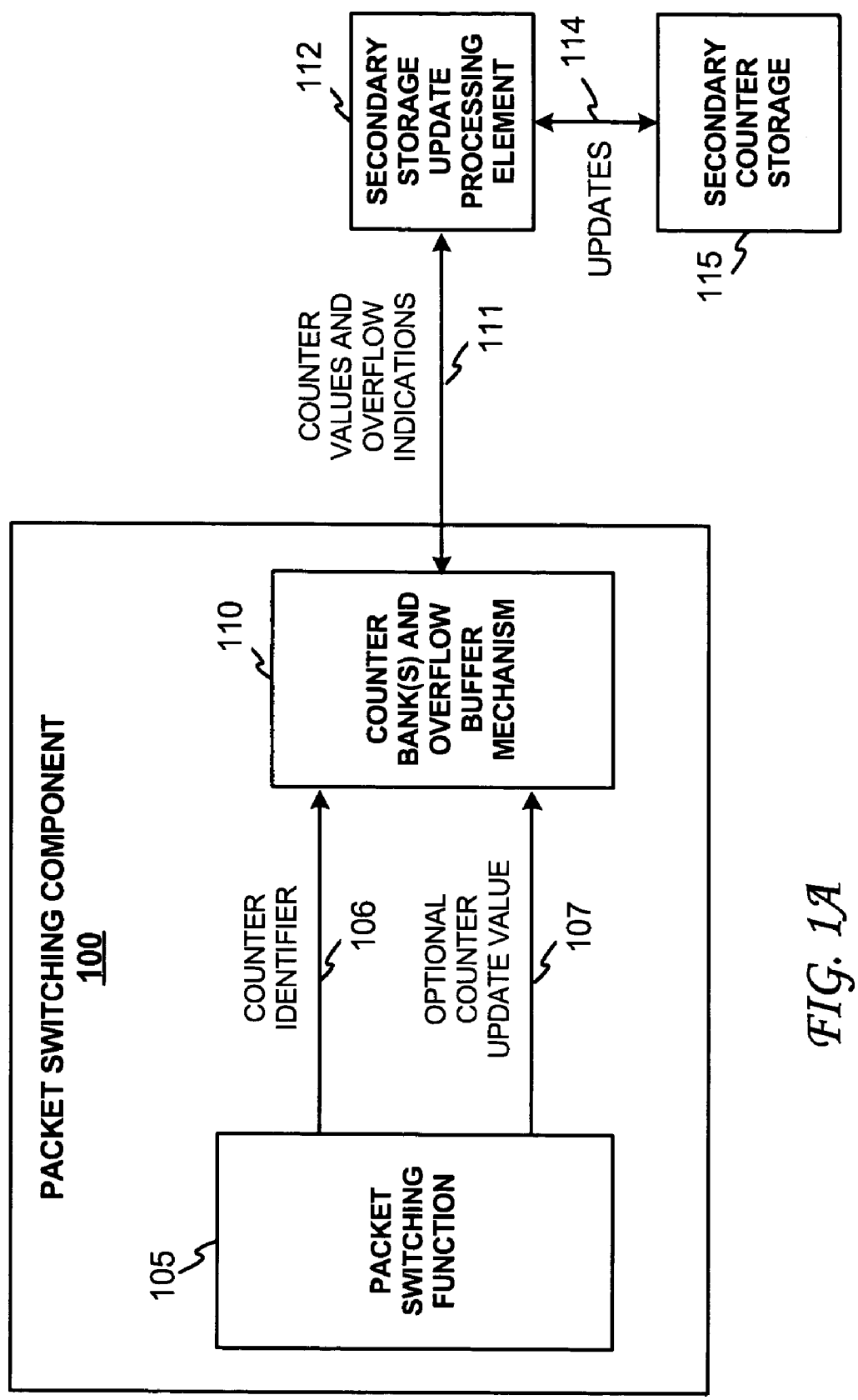
FIG. 1A is a block diagram of a component including the counter banks with an external secondary storage update mechanism and an external secondary counter storage used in one embodiment.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, settop box or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Disclosed are, inter alia, methods, apparatus, data structures, computer-readable media, and mechanisms for maintaining counters, such as in, but not limited to a packet switching system, and updating a secondary counter storage based on values of the counters and entries in an overflow buffer.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in the foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value, the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, inter-process communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, network services, tape drives, or other storage devices. Memories and storage devices may store computer-executable instructions to be executed by a processing element and/or control logic, and data which is manipulated by a processing element and/or control logic. The term "data structure" is an extensible term referring to any data element, variable, data-structure, database, and/or one or more organizational schemes that may be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes a computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "periodic" is used in a broad manner to refer to having or marked by repeated cycles, happening or appearing at regular intervals, as well as recurring or reappearing from time to time, occasional, intermittent, and so on. Moreover, the term "or" is used herein to identify a selection of one or more, including all, of the conjunctive items.

Disclosed are, inter alia, methods, apparatus data structures, computer-readable media, and mechanisms for maintaining counters, such as in, but not limited to a packet switching system, and updating a secondary counter storage based on values of the counters and entries in an overflow buffer.

One embodiment includes a bank of multiple counters; an overflow buffer configured to store overflow indications corresponding to the counters; a counter update mechanism configured to update counters based on input values, and if updating a counter generates an overflow condition, adding an entry to the overflow buffer to identify the counter; a secondary storage for maintaining secondary counter values corresponding to the multiple counters; and a secondary storage update mechanism configured to update the secondary counter values in the secondary storage. The updating of the secondary counter values typically includes (a) for each particular counter of the multiple counters, reading and resetting a current value of the particular counter and adding its current value, at least when non-zero, to a corresponding secondary counter value in the secondary storage; and (b) for each particular entry of at least a subset of entries currently stored in the overflow buffer if the overflow buffer is not empty, retrieving the particular entry from the overflow buffer and adding a value corresponding to the overflow condition corresponding to the particular entry to a corresponding secondary counter value in the secondary storage. In one embodiment, each of the entries in the overflow buffer includes an index into the bank of the counters to identify the corresponding counter.

One embodiment maintains counters, which typically includes: updating a current value of a particular counter of multiple counters maintained in a counter bank in response to an identification of the particular counter, and if an overflow condition results, then adding an indication corresponding to the particular counter to an overflow buffer; and updating values in a secondary storage, the values corresponding to the multiple counters. The updating of the values in the secondary storage typically includes: (a) visiting each of the counters to update corresponding values in the secondary storage, and (b) retrieving one or more indications from the overflow buffer if it is not empty and updating corresponding values in the secondary storage based on the retrieved indications. In one embodiment, visiting each of the multiple counters to update corresponding values in the secondary storage includes reading and resetting each of the multiple counters. In one embodiment, updating corresponding values in the secondary storage based on retrieved entries includes adding an overflow value corresponding to the overflow condition to said corresponding values in the secondary storage.

An important property of many of the counters is that they are arranged into "banks". A "bank" of counters is typically defined as, but not limited to a set of counters in which at most C counters in the set can be updated at one time, where C is typically an integer, and is often one or some other small integer. The value of C can be used in determining the sizes of the counters maintained in a bank and the overflow buffer, as well as determining the rate at which the secondary counters must be updated based on the counters maintained in a bank and the overflow indications added to the overflow buffer.

An assumption in a counter bank is that every update might apply to a same counter, and thus affect the rate at which it must be read before it overflows. For example, in one embodiment, counters are maintained for forwarding entries in a table, and each forwarding table entry has packet and byte counters associated with it. A forwarding table entry's byte and packet counters are updated every time a packet is forwarded to that forwarding table entry. In this embodiment, the set of forwarding table entry byte counters form one bank and the set of packet counters form another. However, in one embodiment, these counters are stored in a single counter memory.

In a typical counter bank implementation wherein C equals one, there is one counter per entry in the bank. If the entire counter bank can be scanned by a secondary storage update mechanism in time T, then the counters must be wide enough to ensure that no counter could possibly overflow in time T. This implementation (i.e., without an overflow buffer) is somewhat wasteful of bits, because at most one counter can overflow in time T. The vast majority of the counters will not be anywhere near overflowing. If one counter overflows in time T, then all other counters must have no packets. Generalizing, the critical observation is this: if a single counter in a bank can overflow in time T, then at most two counters can overflow in time 2T, at most four counters in time 4T, and in general at most N counters can overflow in time NT. This fact has a profound implication. By adding an overflow buffer, the total number of bits required in the counter bank can be significantly decreased without reducing the externally-perceived time it takes the bank (or rather, some counter in the bank) to overflow.

An overflow buffer typically consists of a small, N-entry table associated with the memory. In one embodiment, the overflow buffer is a queue or circular buffer that stores the indices of the last N counters that overflowed.

In one embodiment, when a counter update to a counter in a bank causes it to wrap, the (truncated) new counter value is written back to the counter bank as usual, the index of the overflowing entry is written into the overflow buffer, and the overflow buffer's "next" pointer is advanced (e.g., the index of the counter is enqueued into the overflow buffer). A secondary memory update mechanism is typically responsible for keeping track of which overflow buffer entries it has read and for visiting the overflow buffer fast enough to prevent unread entries from getting overwritten. Note that error processing, such as providing an error notification to a system monitoring process, is performed in one embodiment if the overflow buffer becomes full or overflows.

One embodiment operates as follows. The entire bank is scanned with some period T, and all secondary counters are augmented by a value read from the corresponding hardware counter. Additionally, in that same interval T, the entire overflow buffer is also scanned, and for each new entry in the overflow buffer (i.e., the entries added since the last time the overflow buffer was scanned), the corresponding secondary counter is incremented by an amount equal to its overflow value. For example, if the counter is w bits wide, then the corresponding secondary counter is typically incremented by $2^w$.

Suppose it takes the secondary counter update mechanism time t to read one hardware counter and update the corresponding secondary counter. An N-entry counter bank may therefore be completely scanned in time t*N. Now assume that a B-entry overflow buffer is added to the counter bank and that it takes time t to process one overflow buffer entry. In time t*(N+B), the entire counter bank and the overflow buffer can be scanned. The values of the hardware counters are only lost if the entire overflow buffer fills up before the secondary counter update mechanism scans it. This can only happen if more than B counters overflow in the time it takes to scan the entire bank and overflow buffer. Alternatively, if the scan interval for the bank and overflow buffer is T seconds, then the addition of a B-entry overflow buffer can reduce the counter memories by log 2(B) bits without reducing the overflow time.

For example, in one embodiment with a 64 k-entry memory that counts packets and bytes, by adding one 16-entry overflow buffer to each of the two counter banks (the packet bank and the byte bank), four bits can be removed from each of the counters without losing any effective counter capacity. Each table has a 16 bit index, so the number of bits added for the overflow buffer is 2*16*16=512 bits, plus 2*16 bits of pointers. The number of counter bits saved is 64 k*4*2=512 k bits, which is a dramatic savings. If instead two 256-entry overflow buffers are used, the amount saved is one megabit minus four kilobits.

For example, if embodiments use only power-of-two overflow buffer sizes, each doubling in the size of the overflow buffer eliminates one more bit from the counter bank without increasing the scan time of the bank. Once the size of the overflow buffer exceeds some value (which can be derived from the bank size), the benefit accrued by shrinking the counter bank is typically offset by the increase in size of the overflow buffer. For example, if the bank has $2^n$=N entries in it, then each doubling of the overflow buffer's size from B to 2B can eliminate N bits from the counter bank, but this typically requires the size of the overflow buffer to be increased by B*n bits.

Turning to FIG. 1A, illustrated is an exemplary packet switching component 100 including a counter bank and overflow buffer mechanism 110. In one embodiment, packet switching component 100 is a chip, ASIC, board, or other entity.

As shown, packet switching function 105 generates a counter identifier 106 and optionally a counter update value 107. Counter identifier 106 is used to determine which counter in a bank of counters is to be updated. In one embodiment, counter identifier 106 is an address indicator indicating an address in the counter bank (e.g., memory or other storage mechanism). Counter update value 108 (e.g., the number of packets, bytes, etc.) is optionally generated. In some contexts, the value to update the counter may be inferred from the particular counter being updated or it might always be the same (e.g., always update the counter by one or some other value).

Counter bank and overflow buffer mechanism 110 updates its representation of the particular counter in the bank, and if an overflow is generated, then an indication of the counter is added to the overflow buffer.

Periodically, in such a timeframe as to prevent a loss of a counter value, secondary storage update processing element 112 retrieves (111) each of the values in the counter bank and each of the values in the overflow buffer, and updates (114) off-chip secondary counter storage 115 accordingly.

Figure 1B:
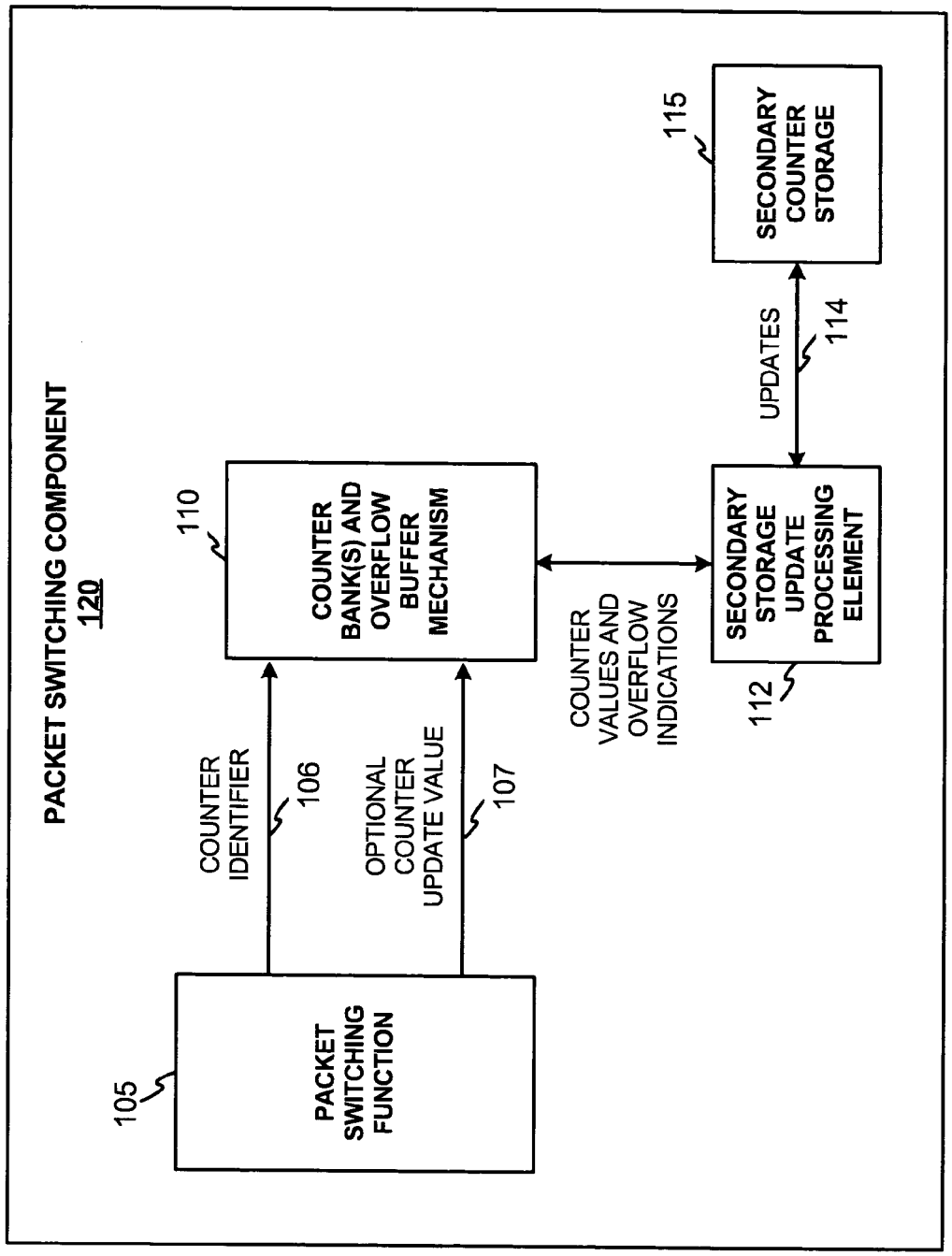
FIG. 1B is a block diagram of a component including the counter banks, the secondary storage update mechanism, and the secondary counter storage used in one embodiment.
Figure 1C:
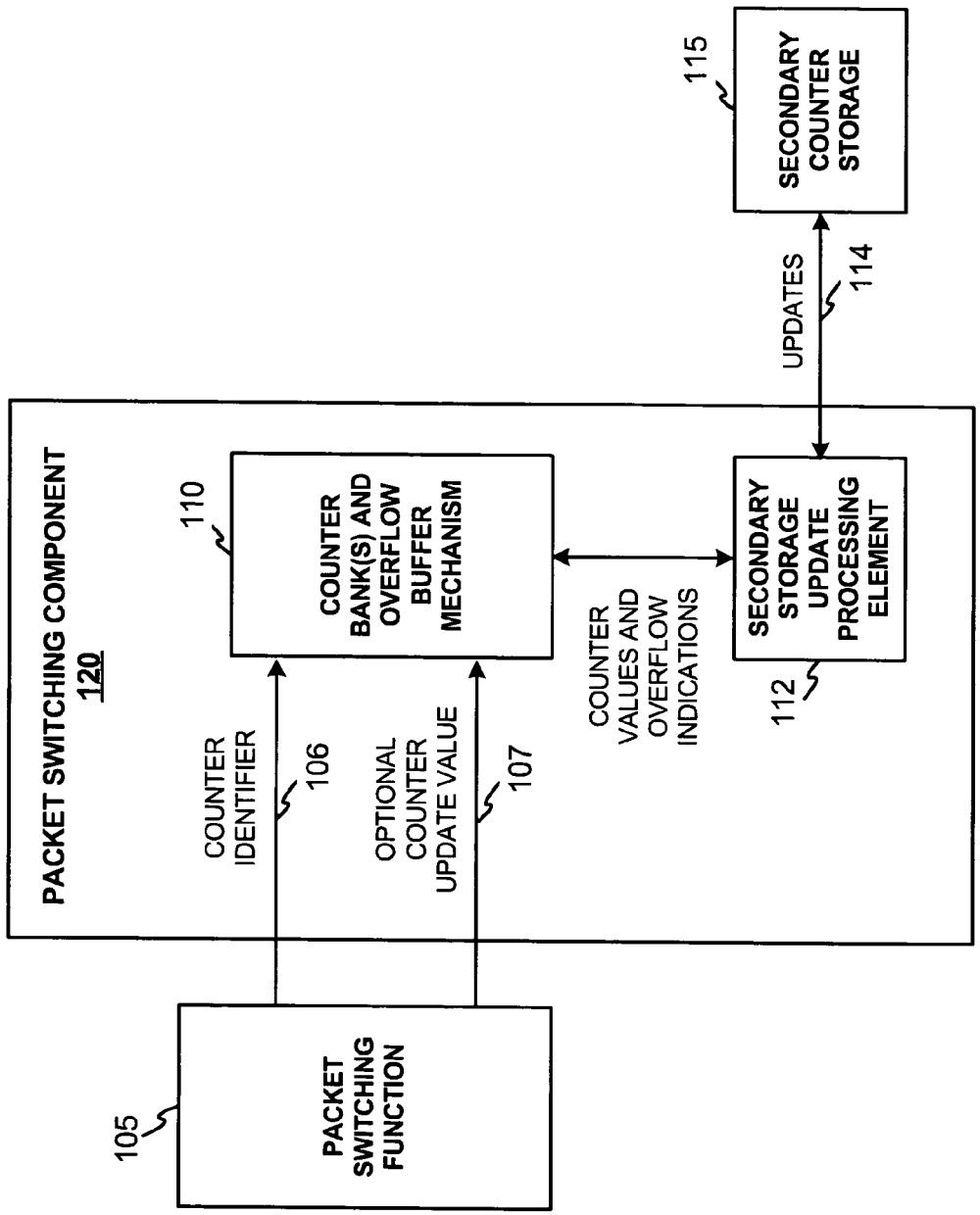
FIG. 1C is a block diagram of a component including the counter banks and the secondary storage update mechanism with an external secondary counter storage used in one embodiment.

Note that embodiments of the invention can be used in an unlimited number of contexts and applications, and the discussion of packet switching merely illustrates one such application. Moreover, the architecture is not limited to one specific configuration. For example, FIG. 1B illustrates that in one embodiment, exemplary packet switching component 120 may include the counter banks, the secondary storage update mechanism, and the secondary counter storage; and FIG. 1C illustrates that in one embodiment, exemplary packet switching component 130 may include the counter banks and the secondary storage update mechanism, with an external secondary counter storage and an external counter update stimuli (e.g., packet switching function 105).

Figure 2A:
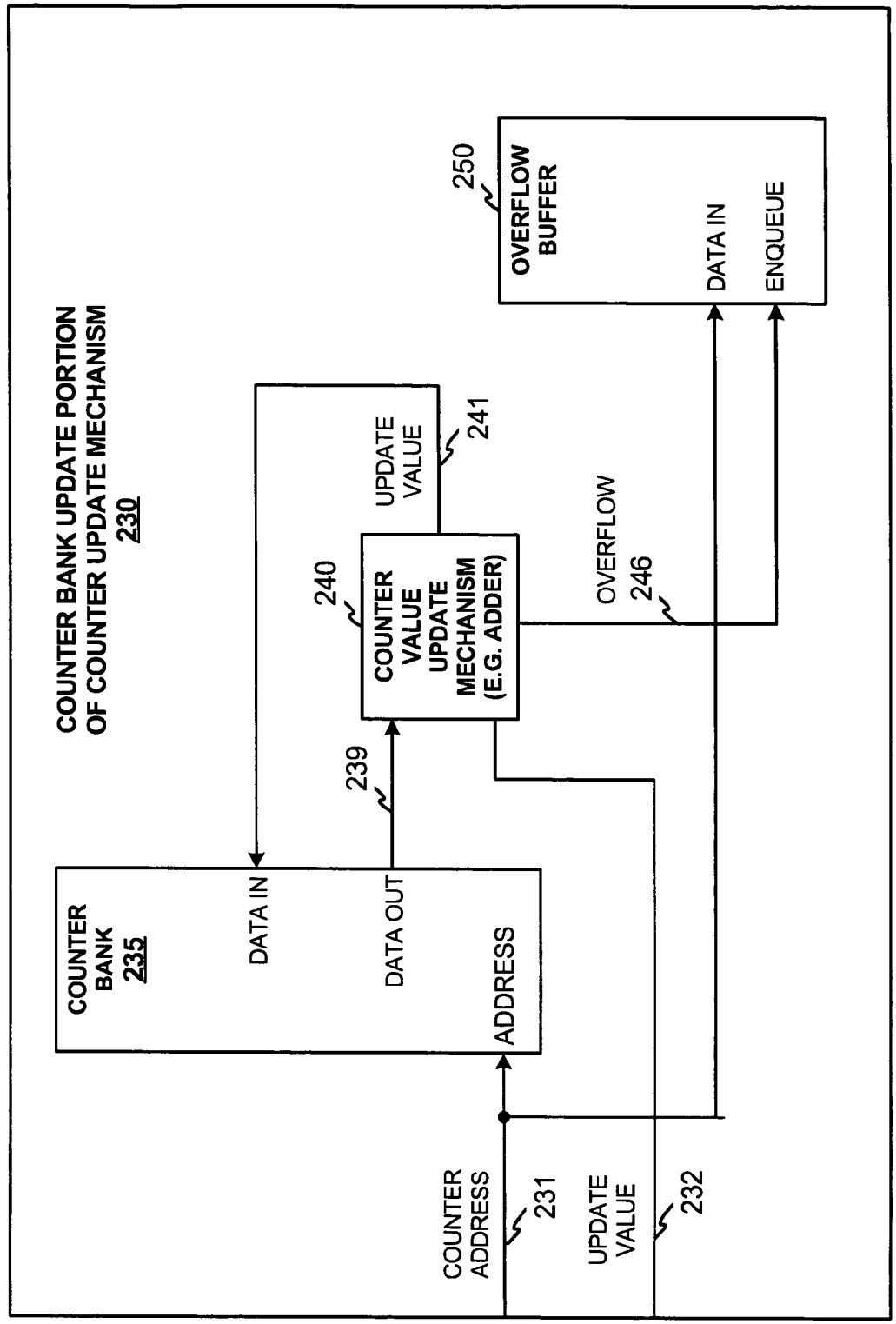
FIG. 2A is a first block diagram of aspects of a counter update mechanism used in one embodiment.
Figure 2B:
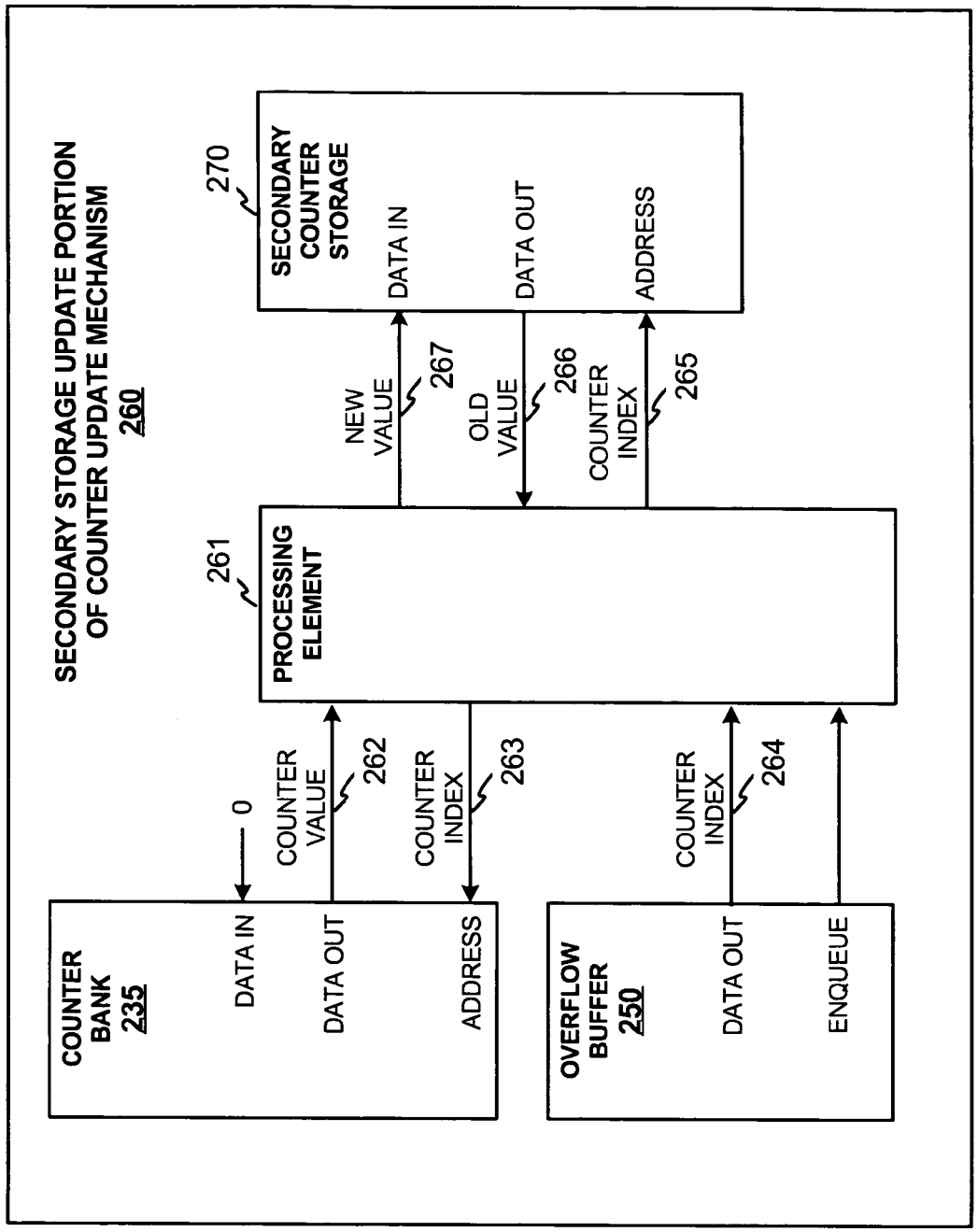
FIG. 2B is a second block diagram of aspects of a counter update mechanism used in one embodiment.

FIGS. 2A-B are block diagrams of aspects 230 and 260 of a counter update mechanism used in one embodiment. Note that these two different views are provided for convenience and ease of understanding, with typically an embodiment performing both functions and thus other connections and connecting elements (e.g., multiplexers, logic gates, etc.) are used to provide both functionality as one skilled in the art would clearly understand.

Shown in FIG. 2A is a portion of an apparatus used by one embodiment to maintain values of counters in counter bank 235 (e.g., a memory, set of hardware counters, etc.), and to update overflow buffer 250 in response to an overflow condition generated during such an update of a counter value. An indication 231 of a counter to be updated is received as well as an update value 232 (which in one embodiment is a constant value of one or some other value, while in one embodiment, it may vary). Counter value update mechanism 240 receives the current value 239 of the counter from counter bank 235 and generates updated value 241 based on update value 232 and current value 239. Updated value 241 is then stored in counter bank 235 as the new value for the counter. If an overflow condition is generated as indicated by signal 246, then the indication of the counter being updated is added to overflow buffer 250.

Shown in FIG. 2B is a secondary storage update portion of counter update mechanism 260 used in one embodiment to periodically update secondary counter storage 270 with current snapshot values of the counters. The current value of a particular counter is its corresponding value stored in counter bank 235 plus an overflow adjustment if there are any corresponding entries in overflow buffer 250 (i.e., an adjustment amount based on one or more corresponding entries in overflow buffer 250).

Periodically, processing element 261 sequences through each of the multiple counters stored in counter bank 235 to retrieve and reset the current value of each counter to an initial value (e.g., typically zero or some other constant) and to update the corresponding counter values maintained in secondary counter storage 270. For example, in one embodiment, processing element 261 will provide a counter index address 263 to counter bank 235 to receive counter value 262 and then to reset the counter's value to zero (e.g., either by writing a zero, using a reset-on-read memory for counter bank 235, etc.). Processing element 261 then provides counter index 265 (corresponding to the counter retrieved from counter bank 235) to secondary storage to receive old value 266, which is then added to counter value 262 to generate new value 267 which is stored in secondary counter storage 270 at the position indicated by counter index 265.

Processing element 261, as part of this periodic updating of secondary counter storage 270, also retrieves each of the entries in overflow buffer 250 and updates corresponding counters stored in secondary counter storage 270. For example, in one embodiment, processing element 261 receives a counter index 264 from overflow buffer 250. Processing element 261 then provides counter index 265 (corresponding to counter index 264 retrieved from counter overflow buffer 250) to secondary storage to receive old value 266, to which an appropriate overflow value (e.g., two raised to the nth power, where n is the number of bits in a counter in counter bank 235) is added to generate new value 267, which is stored in secondary counter storage 270 at the position indicated by counter index 265.

Figure 3:
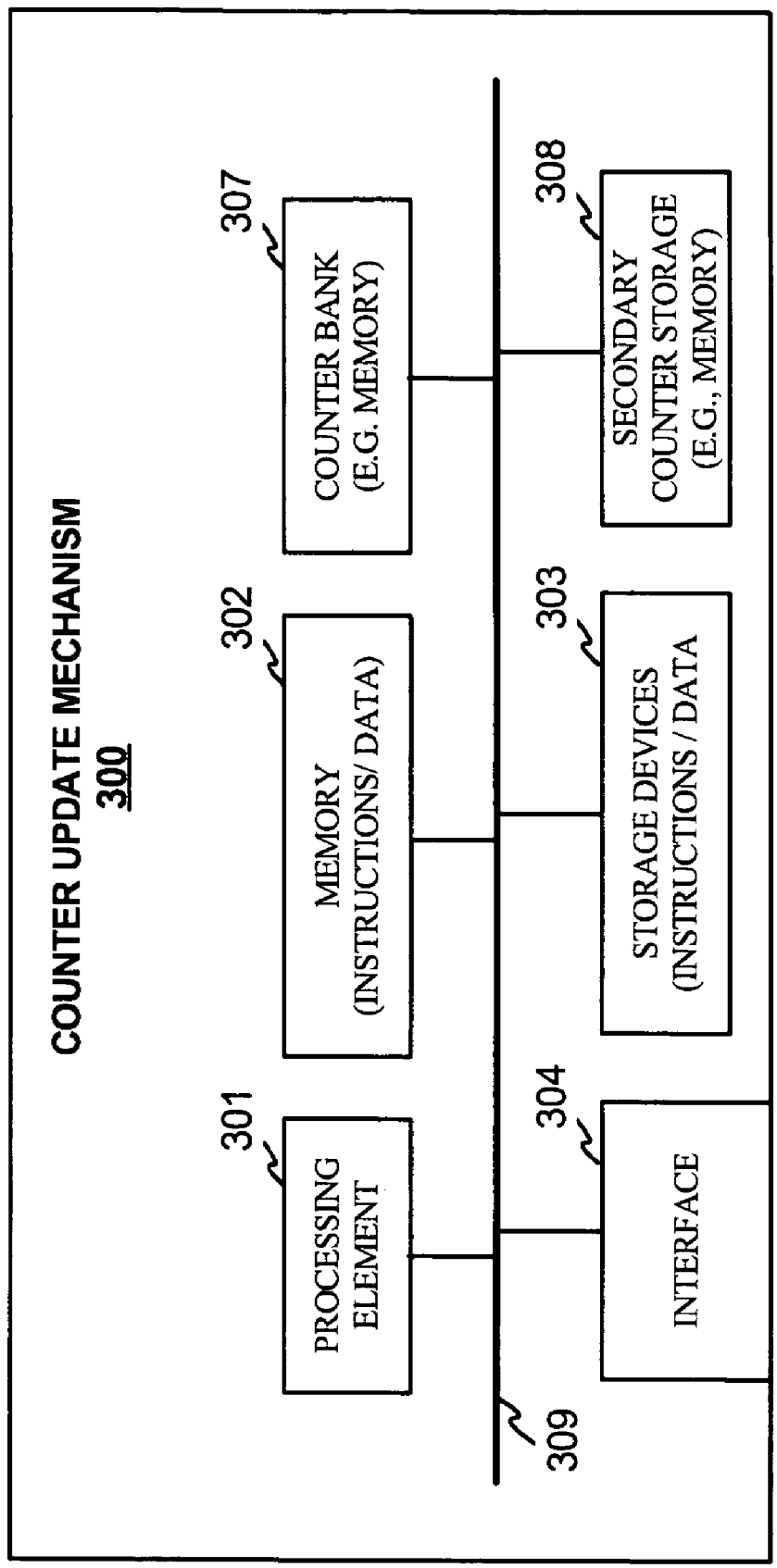
FIG. 3 is a block diagram of a counter update mechanism used in one embodiment.

FIG. 3 is a block diagram of a counter update mechanism 300 used in one embodiment for maintaining counters and updating a secondary counter storage based on values of the counters and entries in an overflow buffer, such as in, but not limited to a packet switching system. In one embodiment, counter update mechanism 300 performs one or more processes corresponding to one or more of the flow diagrams illustrated or otherwise described herein.

In one embodiment, counter update mechanism 300 includes a processing element 301, memory 302, storage devices 303, counter bank 307, secondary counter storage 308, and interface 304 for receiving counter update requests and for communicating stored counter values with other entities and for sending and receiving information/data items and/or communicating with external devices (e.g., processors, packet processors, computers, etc.), which are typically coupled via one or more communications mechanisms 309, with the communications paths typically tailored to meet the needs of the application. Various embodiments of counter update mechanism 300 may include more or less elements. The operation of counter update mechanism 300 is typically controlled by processing element 301 using memory 302 and storage devices 303 to perform one or more tasks or processes. Memory 302 is one type of computer-readable medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with an embodiment. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with an embodiment.

Figure 4:
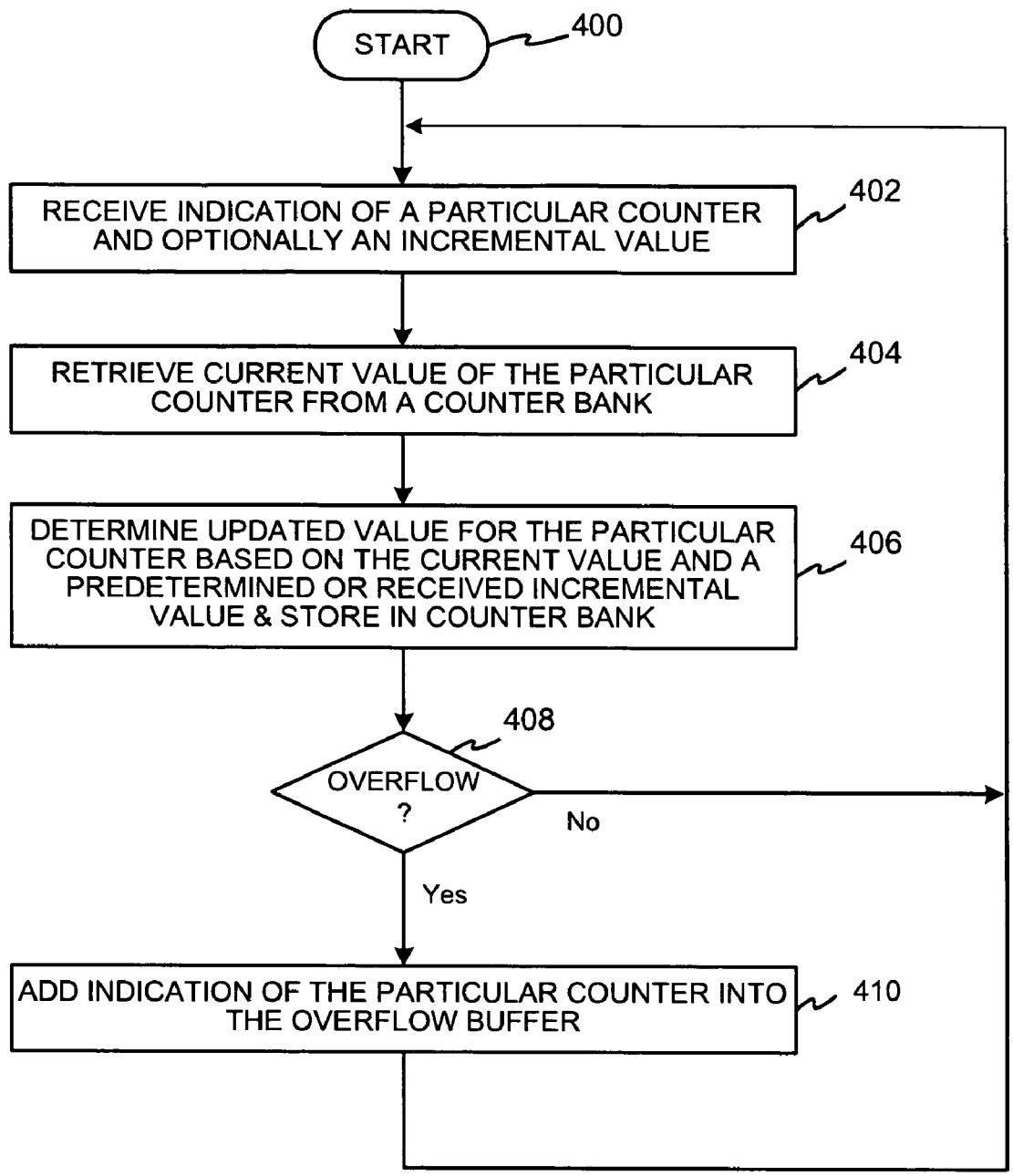
FIG. 4 is a flow diagram illustrating a process for updating counters and adding overflow indications to the overflow buffer used in one embodiment.

FIG. 4 illustrates a process for updating a counter in a counter bank used in one embodiment. Processing begins with process block 400, and proceeds to process block 402, wherein an indication of a particular counter to update is received. In one embodiment, an incremental value is also received (otherwise, the incremental value is already known, such as a constant value, a previously used value, etc.). In process block 404, the current value of the particular counter is retrieved from the counter bank. In process block 406, the updated value for the particular counter is determined based on the current value and the incremental value, and it is stored in the counter bank. As determined in process block 408, if there was an overflow condition generated in response to determining the new value for the counter, then in process block 410, an indication of the particular counter is added to the overflow buffer. Processing returns to process block 402 to update more counters.

Figure 5:
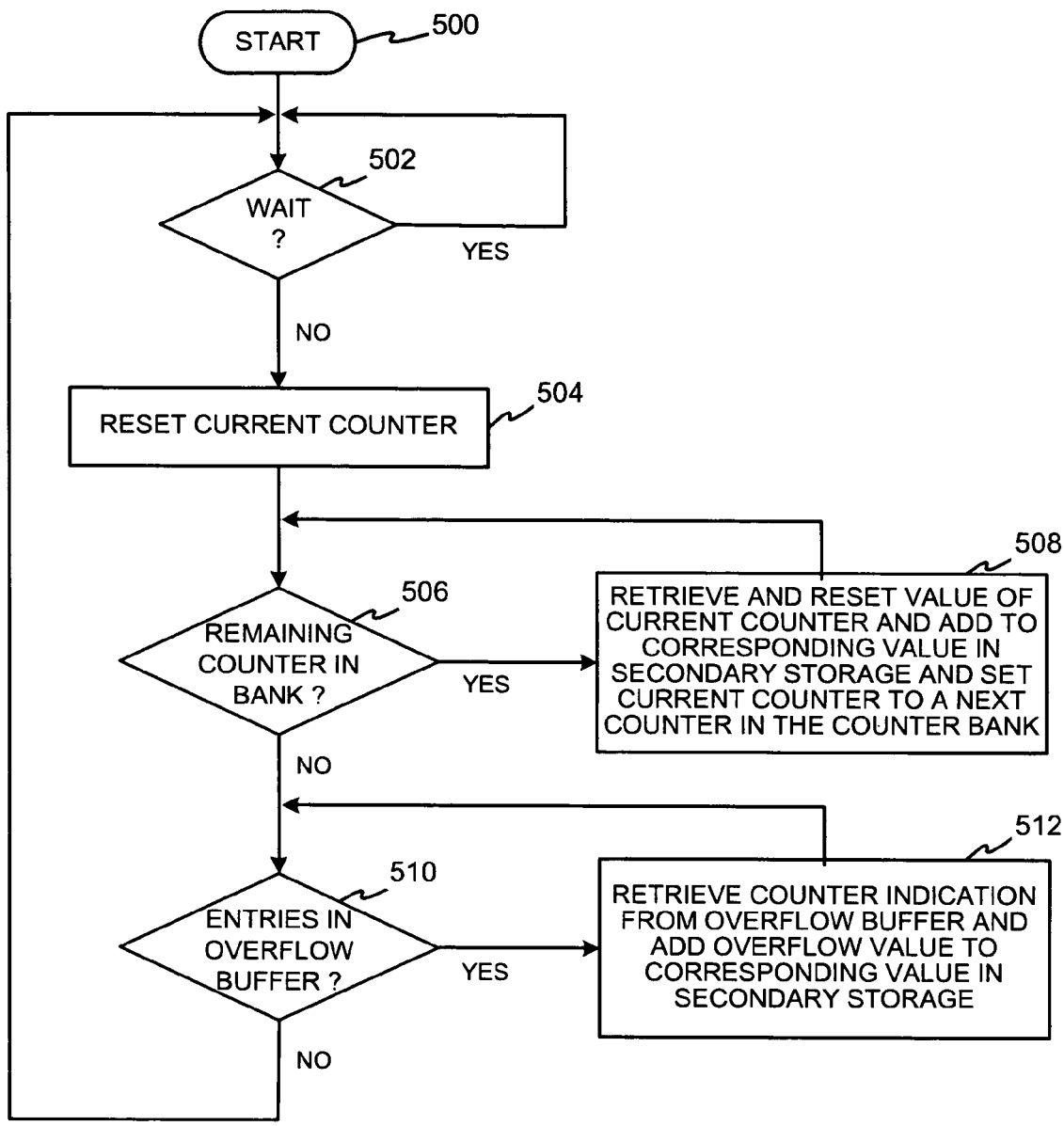
FIG. 5 is a flowchart illustrating a process for updating secondary counters based on counters and an overflow buffer used in one embodiment.

FIG. 5 illustrates a process for updating counters in secondary storage used in one embodiment. Processing begins in process block 500, and proceeds to process block 502, wherein the processing optionally waits until it is time to begin a new update cycle, or proceeds directly to update the counters in the secondary storage. In process block 504, a current counter position variable is reset to that of the first counter in the counter bank. As determined in process block 506, while there remain counters in the counter bank to process, in process block 508, the value of the current counter is retrieved from and reset in the counter bank, with the retrieved value added to the corresponding value of the counter stored in secondary storage, and the current counter is advanced to the next counter. Then, as determined in process block 510, while there remain entries in the overflow buffer (or for some subset of the entries in one embodiment), then in process block 512, an indication of a counter is retrieved from the overflow buffer, and the value of the corresponding counter in secondary storage is updated by a value corresponding to the overflow condition. After the update cycle of the secondary storage is complete, processing returns to process block 502 to repeat another update cycle.

Figure 6A:
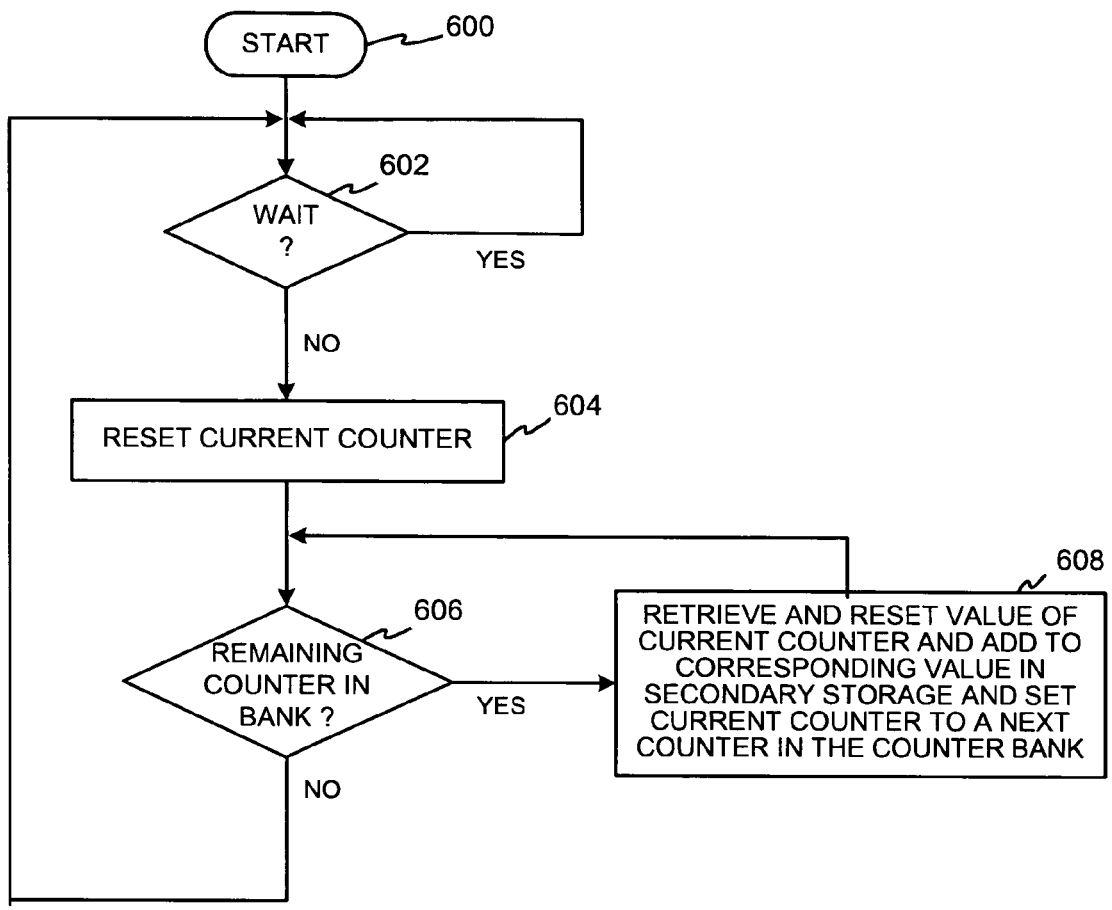
FIG. 6A is a first flowchart illustrating processes for updating secondary counters based on counters and an overflow buffer used in one embodiment.
Figure 6B:
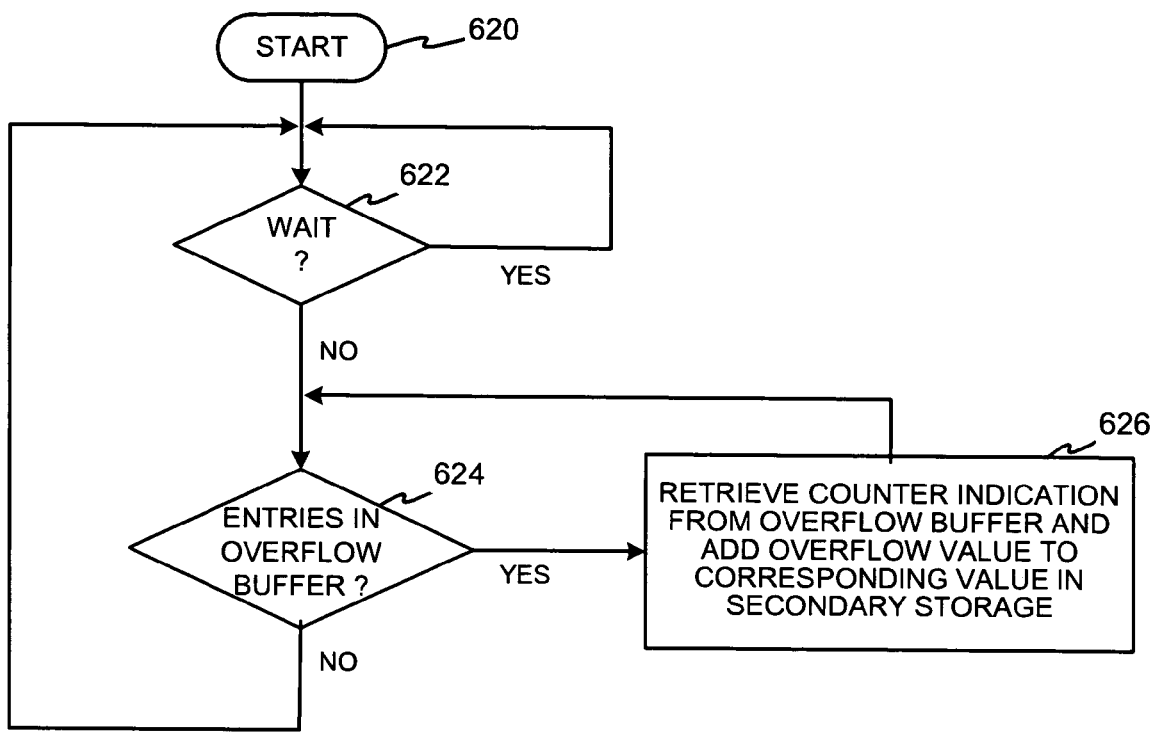
FIG. 6B is a second flowchart illustrating processes for updating secondary counters based on counters and an overflow buffer used in one embodiment.

FIGS. 6A-B are flow diagrams illustrating processes for updating secondary counters based on counters and an overflow buffer used in one embodiment. These figures illustrate that the processing to visit the counters to update the secondary storage counters and the processing to update the secondary storage counters based on the entries in the overflow buffer can be independent, and may or may not run in lock-step with each other. For example, in one embodiment, the processing to visit the counters to update the secondary storage counters and the processing to update the secondary storage counters based on the entries in the overflow buffer runs the same number of times during an update cycle of the secondary counters. In one embodiment during an update cycle of the secondary counters, one update iteration of the processing illustrated in FIG. 6A (i.e., updating the secondary counters based on the counter bank counters) is performed while multiple update iterations of the processing illustrated in FIG. 6B (updating the secondary counters based on the counter bank counters) is performed while multiple iterations of the processing illustrated in FIG. 6B (updating the secondary counters based one entries in the overflow buffer, if any) is performed. A smaller overflow buffer can typically be used if the overflow buffer is visited more often during a secondary counter update cycle than if it is only visited once.

Turning to FIG. 6A, processing begins with process block 600, and proceeds to process block 602, wherein the processing optionally waits until it is time to begin a new update cycle, or proceeds directly to update the counters in the secondary storage. In process block 604, a current counter position variable is reset to that of the first counter in the counter bank. As determined in process block 606, while there remain counters in the counter bank to process, in process block 608, the value of the current counter is retrieved from and reset in the counter bank, with the retrieved value added to the corresponding value of the counter stored in secondary storage, and the current counter is advanced to the next counter. Processing then returns to process block 602.

Turning to FIG. 6B, processing begins with process block 620, and proceeds to process block 622, wherein the processing optionally waits until it is time to begin a new update cycle, or proceeds directly to update the counters in the secondary storage. Then, as determined in process block 624, while there remain entries in the overflow buffer (or for some subset of the entries in one embodiment), then in process block 626, an indication of a counter is retrieved from the overflow buffer, and the value of the corresponding counter in secondary storage is updated by a value corresponding to the overflow condition. Processing then returns to process block 622.

Figure 7:
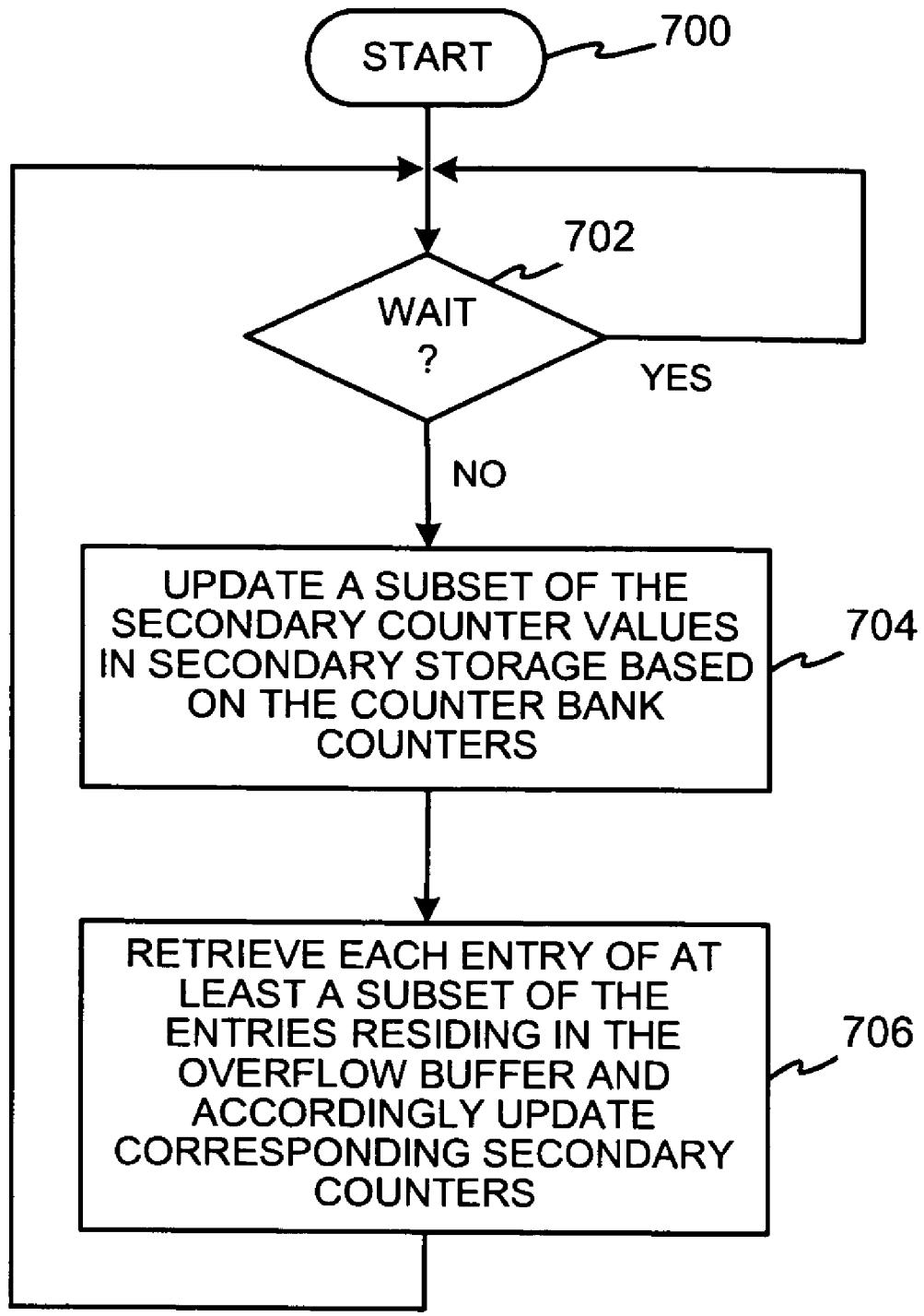
FIG. 7 is a flowchart illustrating a process for updating secondary counters based on counters and an overflow buffer used in one embodiment.

FIG. 7 is a flow diagram illustrating a process for updating secondary counters based on counters and an overflow buffer used in one embodiment. This process illustrates that, in one embodiment, the secondary counters are updated based on: a portion of the counter block counters, then by a portion or all of the entries in the overflow buffer, then by a next portion of the counter bank counters, and so on. Once again, this process just shows another embodiment and further illustrates the extensible nature of various embodiments of the invention.

Turning to FIG. 7, processing begins with process block 700, and proceeds to process block 702, wherein the processing optionally waits until it is time to begin a new portion of the update cycle, or proceeds directly to update the secondary counters in the secondary storage. In process block 704, a subset of the secondary counters is updated based on the corresponding subset of counter bank counters. Then, in process block 706, the secondary counters are updated based at least on a subset of the entries in the overflow buffer (if there are any such entries). Processing then returns to process block 702.

In view of the may possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

The FIGS. 8A through 9C flow diagrams, with reference to FIGS. 2A, 2B and 3, illustrate examples of counter update mechanism embodiments that may be used in conjunction with update mechanism hosting or other counter mechanisms. The illustrated embodiments address implementation considerations of counter update mechanisms according to the invention. Considerations may, for example, include recouping or improving cost, scan rate, reliability or circuitry reduction that may otherwise be inhibited or achieved through the use of particular counter update mechanisms. It will be appreciated, however, that the illustrated embodiments, others or combinations thereof may also be used in accordance with the requirements of a particular application.

As was already discussed, update systems according to the invention enable a substantial reduction in counter system circuitry without requiring modification of an actual or effective (i.e., or apparent) visitation schedule or scan rate that might otherwise be employed. Up to half or more of the memory otherwise required for a counter bank may, for example, be eliminated. In a particular embodiment, a processing element such as a host microprocessor may be used for performing counter updating as well as other operations. For example, processing element 301 of FIG. 3 may perform counter update operations (e.g., see FIGS. 2A, 2B), provide packet information, read and present counter values corresponding to current counter portions, and so on. (The term portion is used herein to refer to a corresponding component or operation in whole or part).

However, a host processing system portion that performs hosting, update or other counter utilization operations in addition to other functionality may be slowed or rendered at least intermittently unavailable by such functionality. Other factors may also hinder optimal counter mechanism operation a particular application. For example, operating systems according to which conventional packet switching or other hosting devices operate typically do not provide for real-time operation. Primary or secondary host communications coupling traffic may also hinder the ability of a host system to provide reliably repeatable counter update operations, as may traffic on host couplings to external devices, among other factors. (Actual/potential individual, composite or propagating delays that may be encountered by a processing system in initiating or completing a scheduled update portion are also referred to herein as processor jitter.)

While it will be appreciated that processor jitter may limit the fastest scan rate that may be reliably achieved, here, conventional counter solutions may produce less than optimal results. For example, further processing resources that may exist or may be added will likely provide for host functionalities other than update operations. Moreover, a limited scan rate may hinder the counter system circuitry reduction that may otherwise be achieved in particular counter mechanism embodiments according to the invention.

In the FIG. 3 embodiment, for example, processing element 301 jitter may result in the inability of processing element 301 to implement a minimum real-time scan rate in a reliably repeatable manner. For example, let us assume that processing element 301 may be capable of conducting an update in one update interval and at a minimum real-time scan rate of x. However, processing element 301 jitter in order to assure that a critical scan rate is met and potential counter wrapping or other problems are avoided (e.g., by adding a jitter-compensating interval to the minimum real-time scan rate. Let us instead assume that processing element 301 conducts updating in more than one update interval (during which partial updates are conducted). Here, offsetting processor jitter may be required for a particular (partial) update or all update portions. Further allowance may also be required for complete or partial updates in which jitter may be tolerable or may become compounded or otherwise propagate in a given embodiment, thereby adding to system complexity.

Increasing processing element 301 speed/efficiency would likely be disregarded under conventional approaches due to the apparent increased cost and likelihood that any available processing bandwidth would instead be devoted to providing further host features. Added circuitry would also likely be disregarded due to apparent cost, size or complexity limitations. A design decision would therefore likely include slowing the scan rate by an amount corresponding to the processor jitter. As will become apparent, however, slowing the scan rate may well inhibit at least part of the circuitry reduction otherwise provided by the counter update mechanism, or may forestall further circuitry reductions that might otherwise be achieved.

Figure 8A:
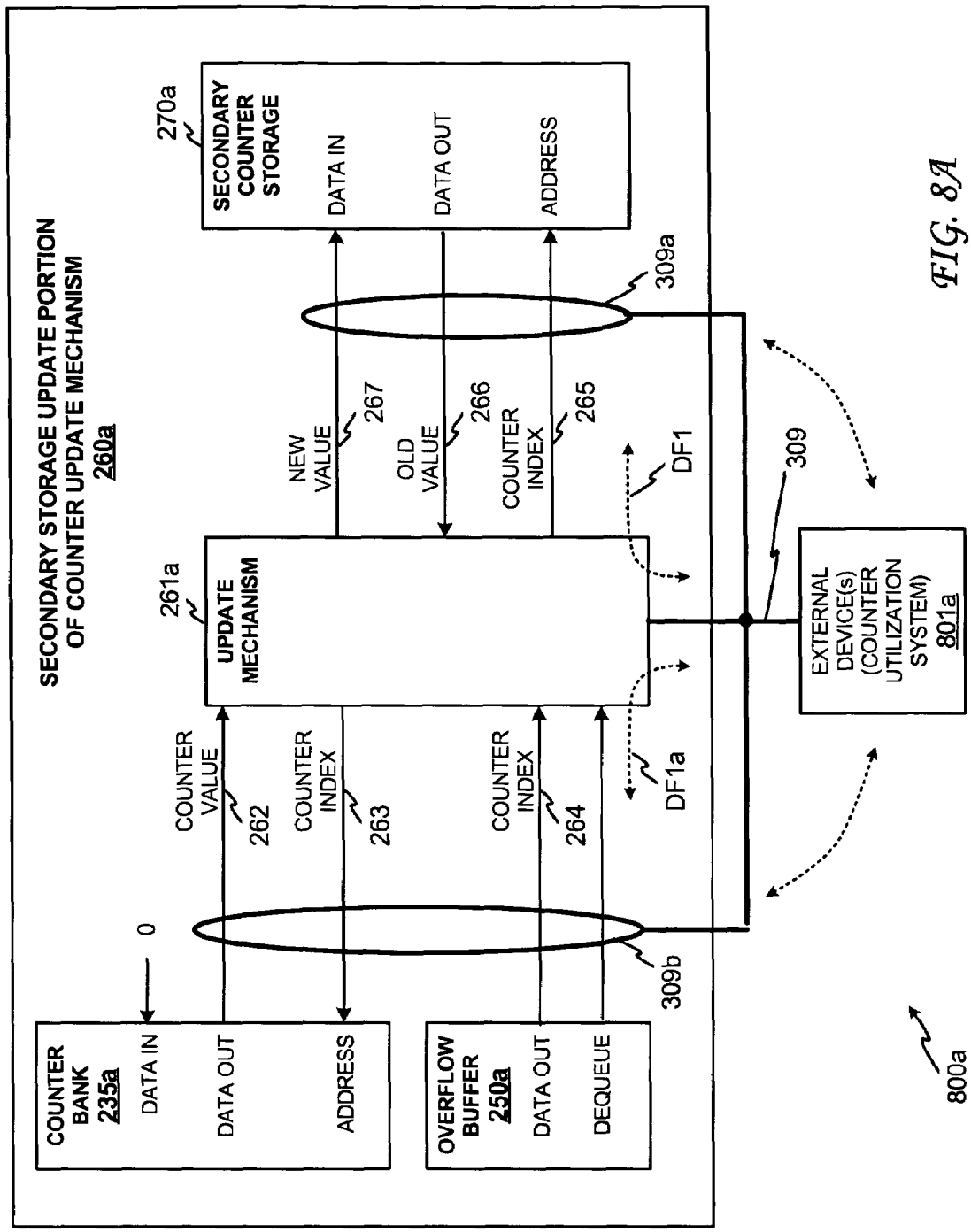
FIG. 8A is a flow diagram illustrating a system in which a counter update mechanism may be used in conjunction with a counter utilization mechanism, according to an embodiment of the invention.

Counter update mechanism portion 260a of FIG. 8A instead avoids the detrimental impact of processor jitter attributable to host processing element operation by adding an update mechanism that is different from a counter utilization mechanism, yet enables the use of counter utilization system resources in conducting counter update operations. The configuration also enables extensive implementation flexibility, for example, by providing for direct or indirect update portion operation by the counter utilization mechanism. Moreover, despite the added circuitry, the system 800a enables a substantial overall circuitry reduction by significantly reducing the counter width or bit depth required for implementing one or more of a counter bank, overflow buffer and secondary storage. A counter circuitry reduction may, for example, reduce counter bank circuitry by up to one half or more—in addition to that provided by the unique update circuitry configuration.

As shown in FIG. 8A, update mechanism 261b is coupled to counter utilization system 801a via bus 309. Bus 309 may include a general purpose or other information transfer coupling of counter utilization system 801a that provides for coupling and conducting information transfer (directly or via a suitable interface) to the data I/O, dequeue and address couplings of the respective update portion components. Update mechanism 261 is further coupled via bus portions 309a, 309b of bus 309 to counter bank 235a, overflow buffer 250a and secondary storage 270a for conducting update operations, or further, for conducting update portion 260a initialization, maintenance, testing, and so on.

Update mechanism 261a may include a microprocessor or other conventional processing element. However, those skilled in the art will appreciate that only a very small amount of processing resources is required for conducting counter update operations (e.g., see above). Therefore, suitable processing elements may also include a finite state machine, a sequencing control or other low resource mechanism that may be implemented with lesser circuitry and reduced cost. Fixed or configurable components such as a programmable gate array (PGA), field-programmable gate array (FPGA), and so on may, for example, be used. Other processing components or some combination may also be used in accordance with the requirements of a particular application.

Operationally, update mechanism 261a may perform the aforementioned counter updating via bus 309. Such operation may, for example, include updating a counter bank portion of counter bank 235a and updating an overflow buffer portion if the counter bank portion updating causes a counter overflow. Updating may further include updating a secondary storage portion of secondary storage 270a with values corresponding to the counter bank portion, and with an overflow buffer portion if the overflow buffer is not empty (e.g., see above). Other operation not inconsistent with the examples discussed herein or some combination may also be used. Such updating may, for example, be conducted by update mechanism 261a via the illustrated data I/O, address and dequeue couplings of counter bank 235a, overflow buffer 250a and secondary counter storage 270a in substantially the same manner as with the embodiments of FIGS. 2A, 2B or 3. Counter update mechanism initialization, maintenance, and so on may further be conducted in an otherwise conventional manner for generally conducting update, maintenance or other operations. Such operations may be conducted by update mechanism 261a, or more preferably by counter utilization system 801a, thereby exploiting available resources and avoiding additional storage or update mechanism circuitry.

(It will be appreciated that various degrees of integration may be employed. Thus, for example, overflow buffer 250a may be implemented in conjunction with a counter bank, secondary storage, or both, as in FIG. 3, or separately as in the present embodiment.)

Counter utilization system 801a is coupled to update mechanism 261a via bus 309 and provides an update mechanism host that may further utilize counter information stored in secondary counter storage 270a, or further, in counter bank 235a or overflow buffer 250a. For example, one counter utilization system 801a embodiment operates as an update mechanism host that provides for storing configurable update mechanism information that may be utilized during update mechanism initialization. Counter utilization system 801a in another embodiment also provides for conducting counter update mechanism initialization, maintenance, testing or other operations. (Such operations may, for example, be conducted in an otherwise conventional manner for generally providing for initialization, maintenance, testing, condition reporting, automatic repair, switching, backup or other operations. In one embodiment, counter utilization system 801a embodiment provides for conducting counter information modification via bus portions 309a, 309b). In yet another embodiment, counter utilization system provides memory or other computer readable media comprising one or more of counter bank 235a, overflow buffer 260a and secondary counter storage 270a.

Counter utilization system 801a may also provide for other update mechanism utilization, such as reading and presenting counter information to a system 800a user or further device (s). Counter utilization system 801a may, for example, read counter information directly via bus portion 309a or by initiating update mechanism 261a to release secondary counter storage or to conduct the read operation. Direct access may, for example, be used in embodiments in which secondary counter storage operation inherently prioritizes write operations over read operations, thereby avoiding utilization system interference with real-time update operation by update mechanism 261a without requiring arbitration. Direct operation may, for example, be used where counter utilization system 801a may provide for counter modification or may perform testing or other operations in a non-interfering manner, among other examples. Indirect operation may be used in embodiments in which further use of counter information is a lower priority or where interference may be more likely, among other examples. Counter utilization system 801a may then present the information in an otherwise conventional manner for presenting information (e.g., via interface 304 of FIGS. 3 or 9A).

It will be appreciated that counter utilization system 801a may also conduct other operations substantially irrespectively of counter update operations performed by update mechanism 261 (i.e. except for sharing of bus 309 by counter utilization system 801a and update mechanism 261a).

Figure 9A:
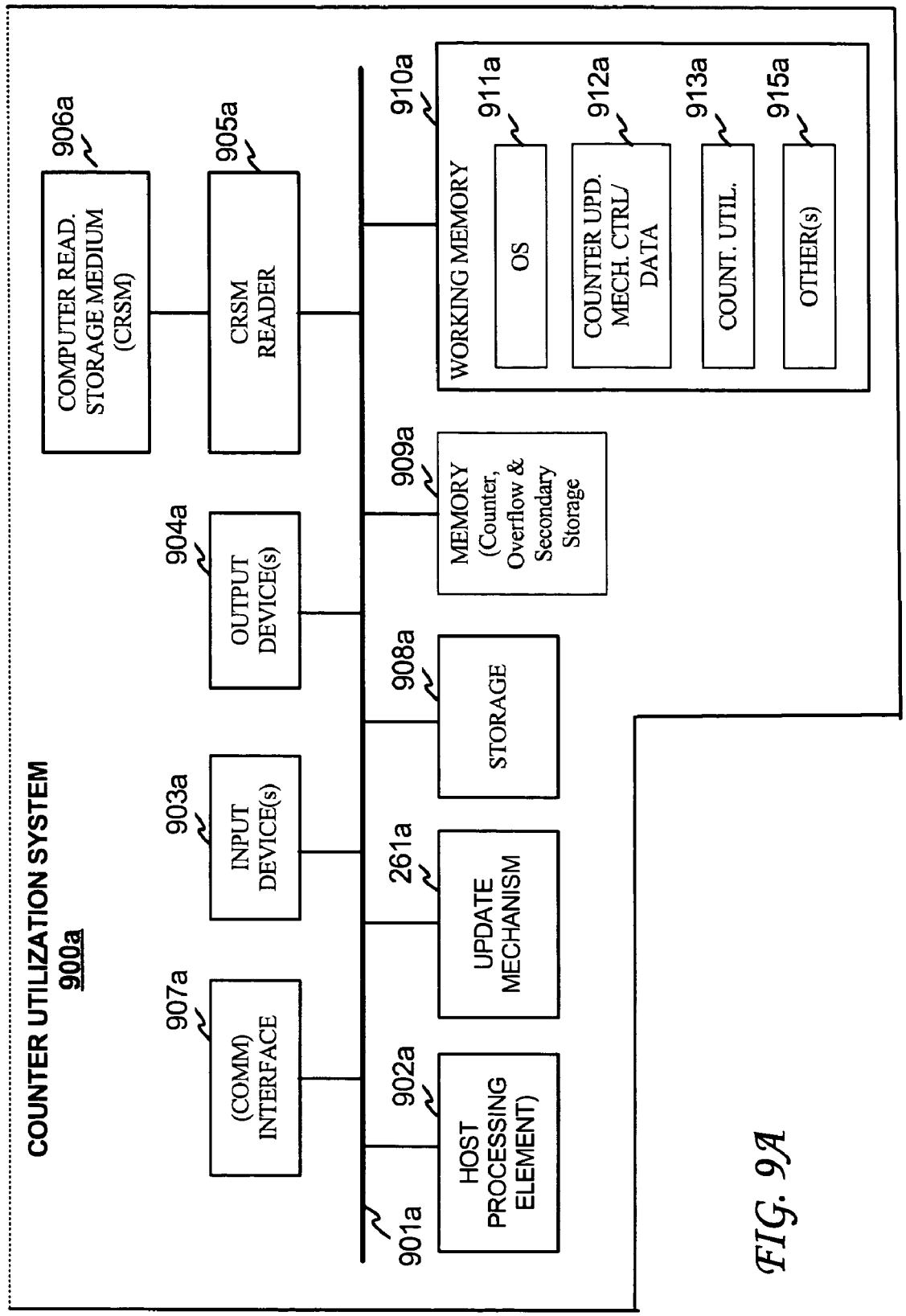
FIG. 9A is a flow diagram illustrating a more specific embodiment of the system of FIG. 8A, according to an embodiment of the invention.

The FIG. 9A flow diagram illustrates a more specific example of a system 800a implementation within which counter update components are wholly integrated into a host counter utilization system 900a. Counter utilization system 900a components (including counter update system components) are coupled via one or more communication channels (e.g. bus 901a) including one or more each of general or special purpose processors 902a, update mechanism 261a, input devices 903a and output devices 904a, which may be selected in accordance with a particular application. System 900a also includes computer readable storage media reader 905a, which is coupled to computer readable storage medium 906a; such devices or media are further indicated separately as storage 908a and memory 909a, and may include hard disk variants, floppy/compact disk variants, digital versatile disk ("DVD") variants, smart cards, partially or fully hardened removable media, read only memory, random access memory, cache memory, and so on, in accordance with the requirements of a particular application. System 900a further includes one or more suitable communication interfaces 907a, including but not limited to a conventional network interface (e.g., implementing an IP or other suitable protocol), a custom interface, and so on, or some combination for providing inter-device communication directly or via one or more suitable private or public networks.

Working memory 910a includes operating system ("OS") 911a, counter update mechanism control/data information 912a, counter utilization control/data information 913a and may include other code/data information 915a, which may be stored or loaded therein during use. The particular OS may vary in accordance with a particular device, features or other considerations in accordance with a particular application. Various programming languages or other tools may also be utilized, such as those compatible with C variants (e.g., C++, C#), the Java 2 Platform, Enterprise Edition ("J2EE") or other programming languages. Such working memory components may, for example, include one or more of applications, add-ons, applets, servlets, custom software and so on for conducting but not limited to the examples discussed elsewhere herein. Counter update mechanism control/data information (update information) 912a may, for example, provide for performing the above-noted initialization maintenance, testing or other hosting of update mechanism 261a, or some combination thereof. Counter utilization control/data information provides for reading and presenting counter value information, and may include other code or data information for modifying counter information in accordance with a particular embodiment. Other programs 918a may, for example, include one or more of security, compression, synchronization, backup systems, groupware code, and so on, including but not limited to those discussed elsewhere herein.

It will be appreciated that counter system hosting or utilization information may also be communicated transitionally or more persistently from local or remote storage to memory (SRAM, cache memory, etc.) for execution, or another suitable mechanism may be utilized, and elements can be implemented in compiled or interpretive form. Input, intermediate or resulting data or functional elements may further reside more transitionally or more persistently in a storage media, cache or other volatile or non-volatile memory, (e.g., storage device 308a or memory 309a) in accordance with a particular application.

Figure 8B:
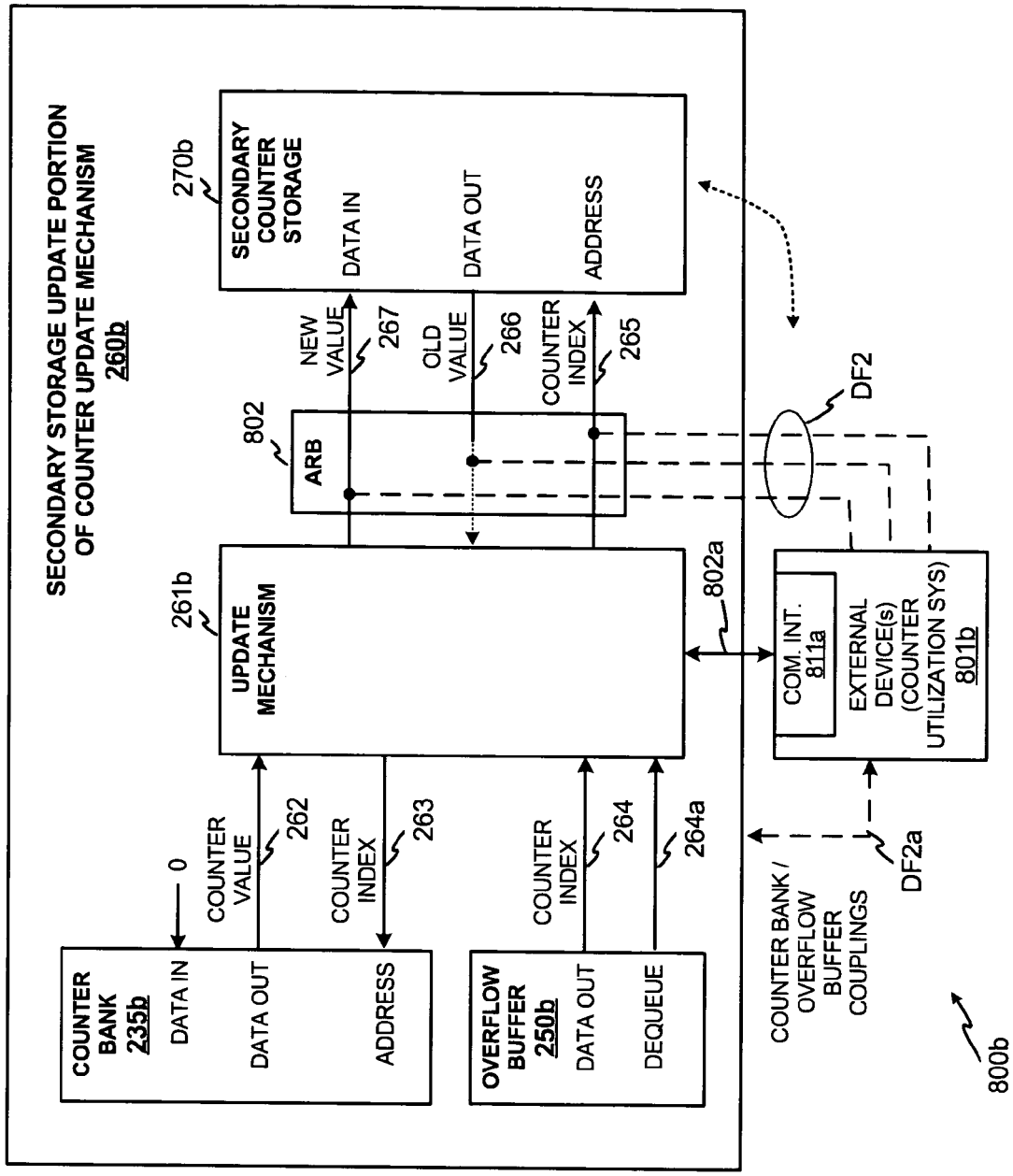
FIG. 8B is a flow diagram illustrating another system in which a counter update mechanism may be used in conjunction with a counter utilization mechanism, according to an embodiment of the invention.

Turning now to the FIG. 8B flow diagram, another update system embodiment 800b is illustrated in which an update mechanism that is different from a counter utilization system may be used to conduct updating—and more preferably, real-time updating. As with system 800a, update system 860b may be hosted by the counter utilization system or otherwise exploit counter utilization system resources, and yet may operate in a substantially independent manner from the counter utilization system. The counter utilization system may also provide for utilizing counter value information, modifying counter value information or conducting update portion initiation, maintenance or other operations, as in system 800a. (Various embodiments may again provide for direct, indirect or combined access to counter update mechanism components.) In the present embodiment, however, update system 260b is not coupled to a counter utilization system bus. As a result, some backup or other counter utilization flexibility may be hindered, while update system 260b may employ a scan rate that is limited by practical considerations rather than the throughput availability of a counter utilization system bus. The counter update mechanism may therefore achieve further speed, reliability cost/circuitry reduction or other advantages in accordance with the requirements of a particular implementation.

Figure 9B:
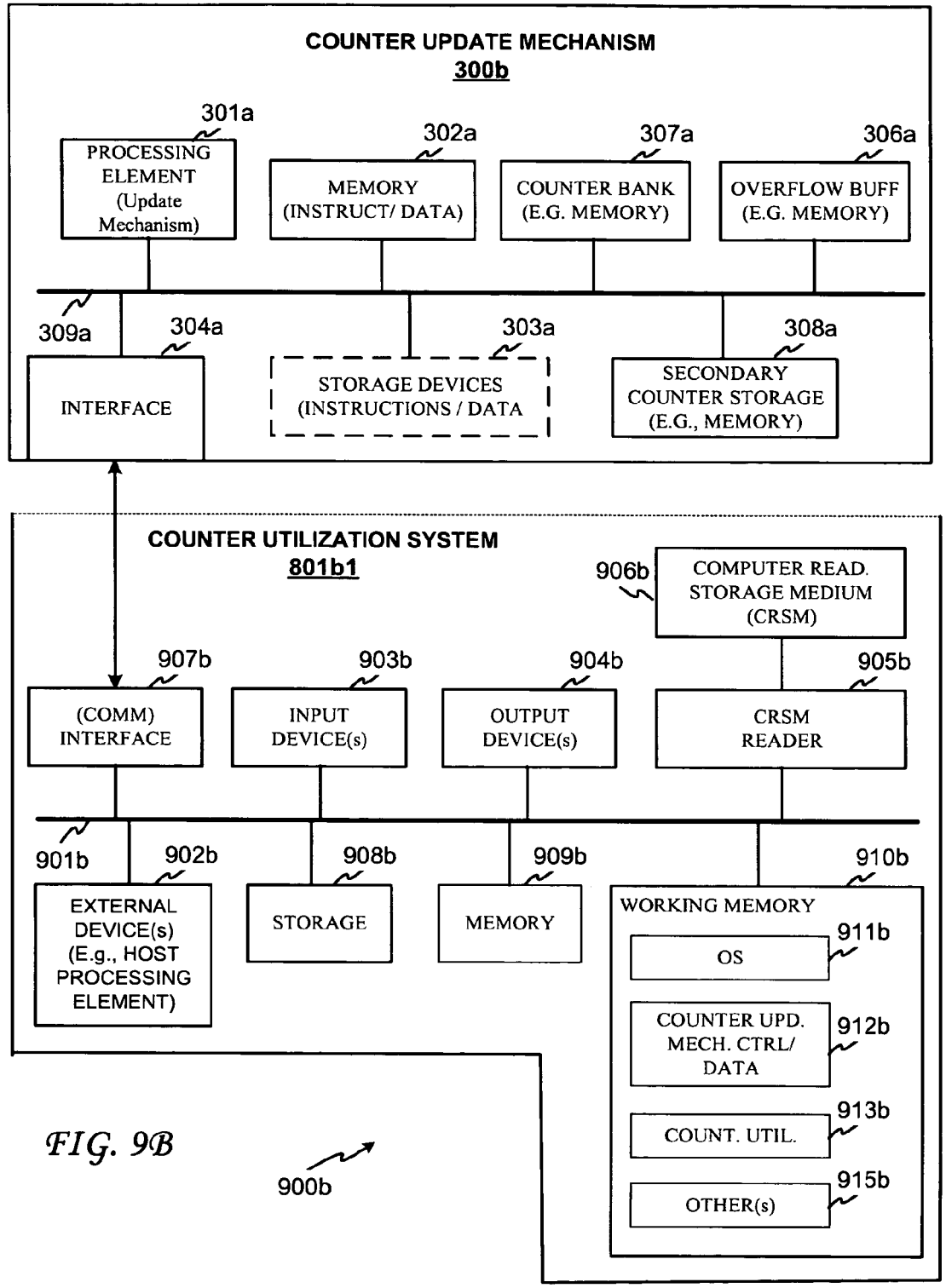
FIG. 9B is a flow diagram illustrating a more specific embodiment of the system of FIG. 8B, according to an embodiment of the invention.

As shown in FIG. 8B, counter update mechanism 261b is coupled to counter utilization system 801a via communication interface 811a (see, for example, FIG. 9B). Counter update mechanism 261b is further coupled to data I/O, dequeue and address couplings of the respective update portion 260b components for conducting update operations, or further, for conducting update portion initiation, maintenance, testing, and so on.

As with system 800a, update mechanism 261b may include a microprocessor or other conventional processing element, or may comprise one or more low resource mechanisms, including but not limited to a finite state machine (FSM) or sequencing control that may be implemented using a programmable gate array (PGA), field-programmable gate array (FPGA), and so on. Other processing components or some combination may also be used in accordance with the requirements of a particular application.

Operationally, update mechanism 261b may perform the aforementioned counter updating via couplings 262 through 267. As with system 800a, such updating may include updating a counter bank portion of counter bank 235b and updating an overflow buffer portion if the counter bank portion updating causes a counter overflow. Updating may further include updating a secondary storage portion of secondary storage 270b with values corresponding to the counter bank portion, and with an overflow buffer portion if the overflow buffer is not empty (e.g., see above). Such updating may, for example, be conducted in substantially the same manner as with the embodiments of FIGS. 2A, 2B or 3. Update mechanism 261b may further conduct counter update mechanism initialization, maintenance, and so on in an otherwise conventional manner for generally conducting such operations via couplings 262 through 267. Alternatively, such operations may be conducted by counter utilization system 801b or some combination of update mechanism 261b and counter utilization system 801b may be employed, thereby enabling available counter utilization system resources to be exploited. (Note that various degrees of integration may be employed. Thus, for example, overflow buffer 250b may be implemented in conjunction with a counter bank, secondary storage, or both, as in FIG. 3, or separately as in the present embodiment.)

Counter utilization system 801b is, in one embodiment, coupled to update mechanism 261b exclusively via communications interface 811a and connection 802a, and performs all counter update utilization operations by initiating update mechanism operation via such coupling. Counter utilization system 801b may, for example, operate as an update mechanism host that stores configurable update mechanism information (e.g., implementing an update mechanism as an FPGA) and may transfer such information to update mechanism 261b via connection 802a during initialization, testing, maintenance, and so on. Counter utilization system 801b may also similarly provide for conducting counter value modification. Counter utilization system 801b may also provide for other update mechanism utilization, such as reading and presenting counter information to a system 800a user or further device(s). Update mechanism may respond in a fixed or configurable manner to an update mechanism read invocation via connection 811a by returning one or more counter values immediately or in a non-interfering manner with updating operation (e.g., delaying the read operation as needed in accordance with a pending or ongoing update). Communications interface 811a may, for example, include a conventional shared or dedicated network interface, backplane or other suitable communications port employing an interface protocol (IP) or other suitable protocol.

In another embodiment, counter utilization system 801b may be coupled in a manner that bypasses update mechanism 261, thereby avoiding added delay due to update mechanism operation. Counter utilization system 801b may, for example, be directly coupled via connection DF2 to secondary counter storage 270b, or further via connection DF2A to counter bank 235b or overflow buffer 250b. Note, however, that the addition of an arbitration unit (e.g., 802) may be desirable in applications in which update operations are to predominate or those in which a very fast scan rate may result in contention for access to update portion components.

In comparing the embodiment of FIG. 8B with that of FIG. 8A, it will become apparent that processor jitter, if any, may approach zero for a system 800b implementation. This is particularly the case with embodiments in which the counter utilization system connection to the update portion is exclusively provided via an update mechanism and invocation of the update mechanism is completely subordinated to update operations. Accordingly, system 800b may also provide for substantially superior circuitry reduction as compared with system 800a. Note however, that there will be a practical limitation at which scan rate or circuitry reduction may be maximized.

For example, update mechanism 251b, counter bank 235b, overflow buffer 250b and secondary storage 270 may each maintain an operational speed (including I/O). In this case, a minimum scan rate may be maintained and an appropriate counter width can be used.

The FIG. 9B flow diagram illustrates a more specific example of a system 800b embodiment. In this embodiment, the counter update mechanism 300a may or may not be hosted by a counter utilization system 801b1, but at least update mechanism 261b, if not one or more of components 235b, 250b, 802b and 270b, is separately implemented. More preferably, all update portion 260b components are implemented separately from counter utilization system 801b1.

Counter update mechanism 300a includes processing element 301a, e.g., a finite state machine (FSM) or sequencing control that may be implemented using a programmable gate array (PGA), field-programmable gate array (FPGA), and so on. Counter update mechanism 300b also includes, memory 302a, storage devices 303a, interface 304a, overflow buffer 306a, counter bank 307a and secondary storage 308a, which are coupled via one or more communications channels 309a, e.g., a bus, I/O connections, and so on, or some combination thereof. Counter update mechanism 300b is operable in substantially the same manner as update portion 260b of FIG. 8B and may conduct updating, maintenance and other operations in an independent or hosted manner as with update portion 260b. The counter utilization system 801b1 configuration is identical to that of counter utilization system 801b and is operable in substantially the same manner for performing hosting or utilization operations as with counter utilization system 801b or counter update mechanism 300 of FIG. 3.

Figure 8C:
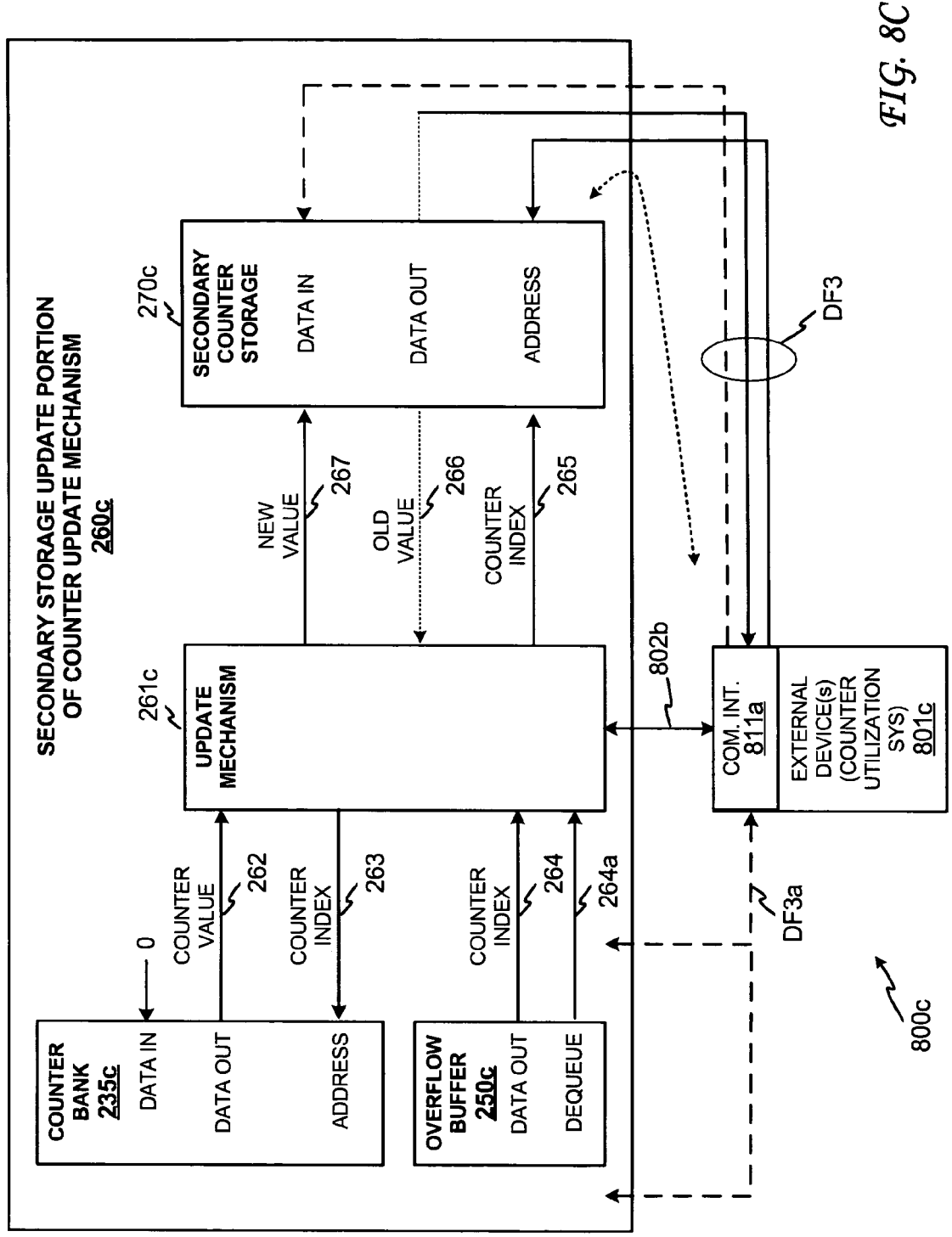
FIG. 8C is a flow diagram illustrating a further system in which a counter update mechanism may be used in conjunction with a counter utilization mechanism, according to an embodiment of the invention.

Turning now to FIG. 8C, an update portion may also be implemented in other or combined embodiments. For example, one or more of the above single-ported memory implementations of counter bank 235c, overflow buffer 250c and secondary storage 270c may be replaceable with various other memory, storage or other devices, including but not limited to the illustrated dual-port RAM (e.g., 270c). Among other advantages, such an implementation may be particularly useful in embodiments in which an update mechanism may conduct very high speed counter updating or a counter utilization mechanism may modify counter information and arbitration circuitry is undesirable. System 800c further illustrates how a counter utilization system (e.g., 801c) may remain passively coupled to one or more update portion components (e.g., counter bank 235c), thereby enabling better fault tolerance, or dual port, direct connection, indirect operation via update mechanism 261c or some combination may also be used, among other alternatives.

As with the FIG. 8A and FIG. 8B examples, update mechanism may again be implemented using an FPGA based state machine, other components or some combination, and may, for example, operate in substantially the same manner as was already discussed. Counter utilization mechanism 801c may also operate in substantially the same manner as was already discussed, for example, with reference to FIGS. 8A and 8B.

It will be appreciated that, while some improvement may be achieved, minimum scan rate, circuitry reduction and other tradeoffs are generally comparable to the system 800b implementation. The added size and cost may also render this solution less desirable in applications in which such tradeoffs predominate.

Figure 9C:
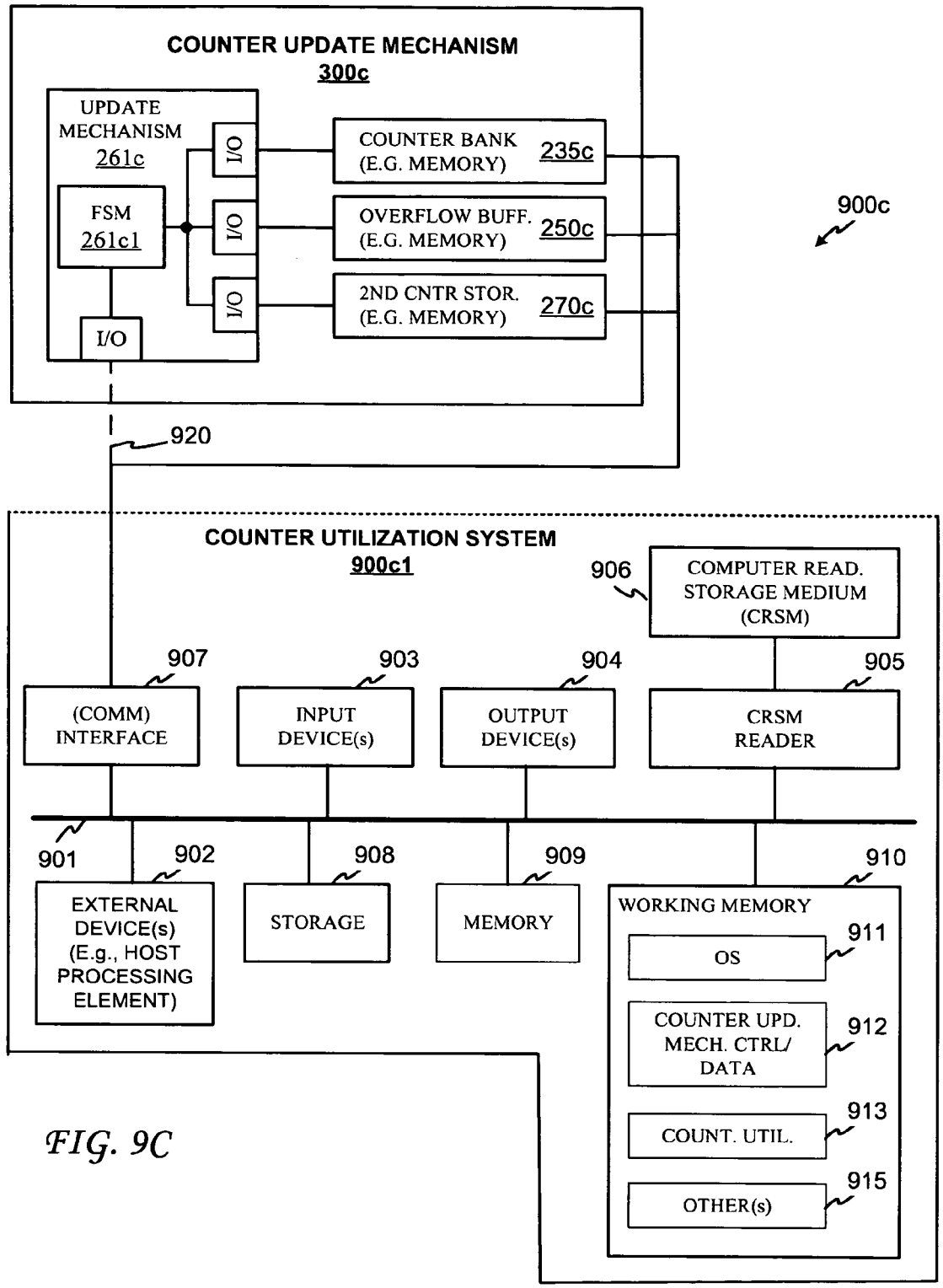
FIG. 9C is a flow diagram illustrating a more specific embodiment of the system of FIG. 8C, according to an embodiment of the invention.

The FIG. 9C diagram illustrates a more specific example of a system 800c embodiment of FIG. 8C. In this embodiment, the counter update mechanism 300a may or may not be hosted by a counter utilization system 801c1, but at least update mechanism 261b, if not one or more of components 235c, 250c, 802c and 270c, is separately implemented. More preferably, all update portion 260c components are implemented separately from counter utilization system 801c1. Counter update mechanism 300a includes update mechanism 261c, which may, for example, include a finite state machine (FSM) or sequencing control that may be implemented using a programmable gate array (PGA), field-programmable gate array (FPGA), and so on. Counter update mechanism 300c also includes counter bank 235c, overflow buffer 250c and secondary counter storage 270c, which are implemented using dual-port memory (e.g., SRAM) in the illustrated embodiment. Counter update mechanism 300c is operable in substantially the same manner as update portion 260c of FIG. 8C and may conduct updating, maintenance and other operations in an independent or hosted manner as with update portion 260c. The counter utilization system 801c1 configuration is identical to that of counter utilization system 801b1 and is operable in substantially the same manner for performing hosting or utilization operations as with counter utilization system 801b1 or counter update mechanism 300 of FIG. 3.

Figure 10:
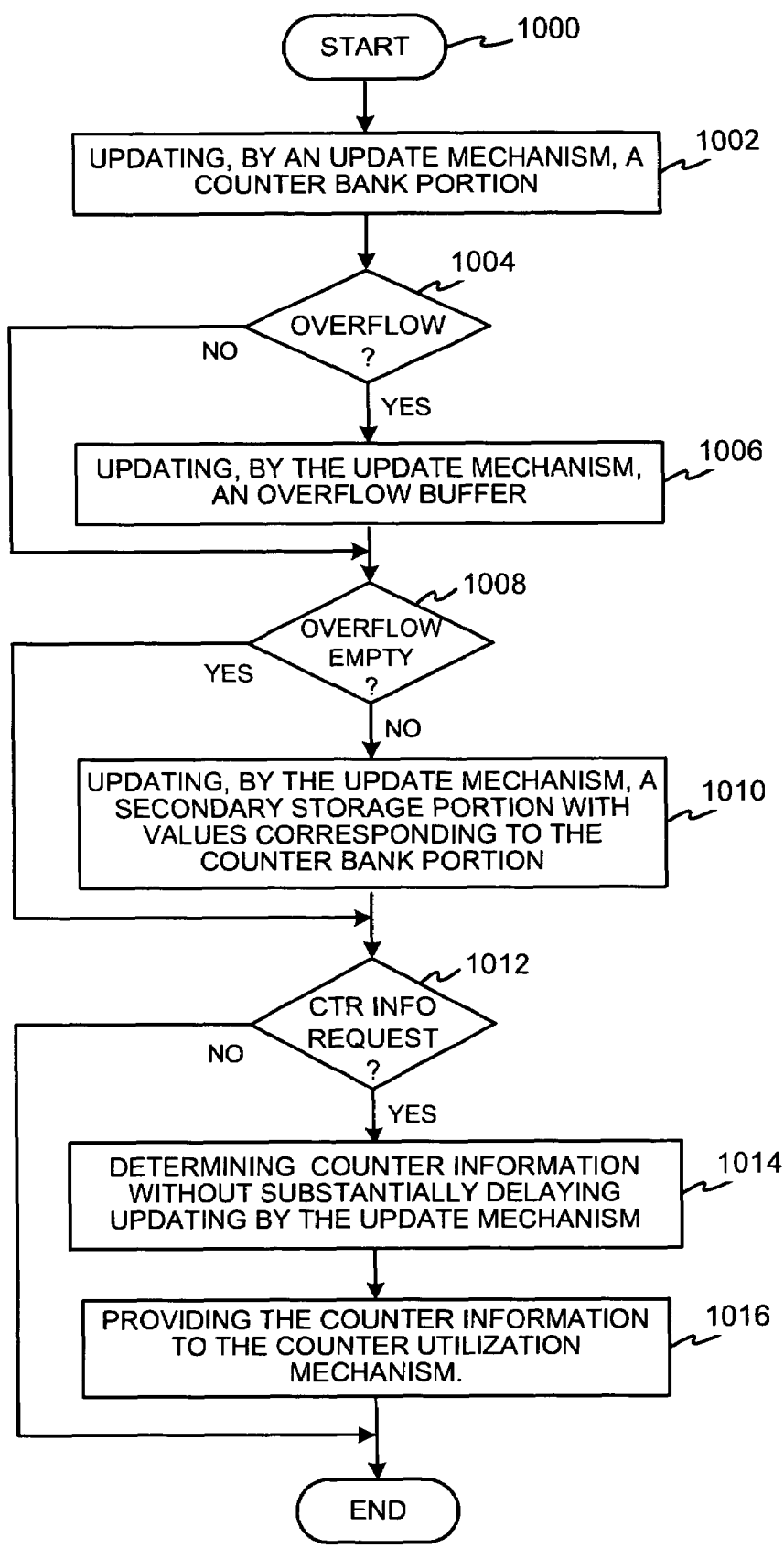
FIG. 10 is a flowchart illustrating a process for updating secondary counters based on counters and an overflow buffer used in one embodiment.
Figure 11:
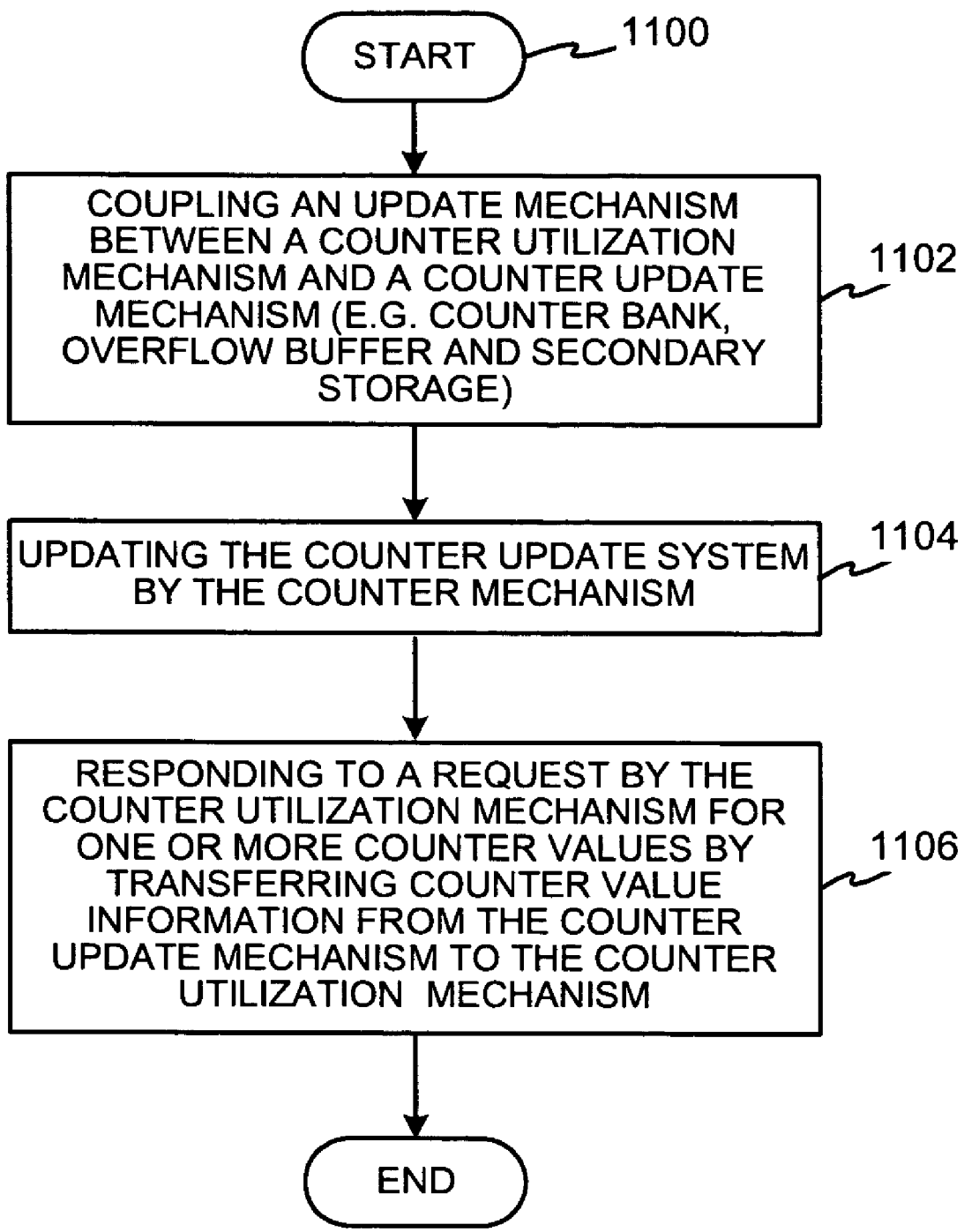
FIG. 11 is a flowchart illustrating another process for updating secondary counters based on counters and an overflow buffer used in one embodiment.

FIGS. 10 through 11 are flow diagrams illustrating processes for conducting updating, which updating may be conducted in conjunction with an update system host, according to embodiments of the invention. As with other examples discussed herein, one or more update iterations may be conducted. For example, one embodiment provides for conducting a complete update during one iteration, while another embodiment provides for conducting two or more partial iterations during which less than all of the counter bank counters, overflow buffer locations or secondary storage locations may be updated. Iterations may further be conducted according to one or more than one update interval that may be applicable to a counter bank, overflow buffer or secondary storage update, and update intervals may be fixed or variable, for example, causing an update mechanism to wait before initiating or completing an iteration portion. (These or other features, options or other considerations that may be applicable to FIGS. 10 and 11 have been excluded so as not to obscure aspects of the illustrated embodiments. See, for example, FIGS. 5 through 7)

Turning to FIG. 10, processing begins with process block 1000, and proceeds to process block 1002, wherein an update mechanism updates a counter bank portion (i.e., a complete or partial update). If, in process block 1104, the updating causes a counter overflow, then the update mechanism updates one or more corresponding overflow buffer locations. Otherwise, the process continues with process block 1008. If, in process block 1008, a current overflow buffer portion is not empty, then the update mechanism updates a secondary storage portion with values corresponding to the counter bank portion in process block 1010 (e.g., in the manner already discussed). Otherwise, the process continues with process block 1012. If, in process block 1012, a counter value information request is received from a counter utilization mechanism, then corresponding counter information is determined and provided to the counter utilization mechanism in blocks 1014 and 1016 without substantially delaying updating by the update mechanism. Employing systems 800a through 800c of FIGS. 8A through 8C, for example, the counter utilization mechanism request may be received by the update mechanism, which may then conduct a read operation (e.g., system 800b), or the counter utilization system may request the information from the secondary counter storage or other counter system components directly (e.g., systems 800a and 800c). Other iterations may also be conducted, for example, as was already discussed.

Turning to FIG. 11, processing begins with process block 1100 and proceeds to process block 1102. In process block 1102, an update mechanism is coupled between a counter utilization mechanism and a counter update mechanism, which mechanism may include a counter bank portion, an overflow buffer portion and a secondary storage portion. In process block 1104, the counter mechanism updates the counter update system. In process block 1106, the counter update mechanism responds to a request by the counter utilization mechanism for one or more counter values by transferring corresponding counter value information from the counter update mechanism to the counter utilization mechanism. As with the embodiment of FIG. 10, the counter utilization mechanism request may be received by the update mechanism, which may then conduct a read operation (e.g., system 800b), or the counter utilization system may request the information from the secondary counter storage or other counter system components directly (e.g., systems 800a and 800c). Other iterations may also be conducted, for example, as was already discussed.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A counter updating system, comprising:
   an update mechanism for updating a counter system portion for counting a number of events that occur for communication of packets through a network device according to at least one substantially real-time update interval, the updating including updating a counter bank portion, updating an overflow buffer portion if the counter bank portion updating causes a counter overflow, and updating a secondary storage portion with values corresponding to the counter bank portion if the overflow buffer is not empty or if the counter bank has been modified; and
   a different counter utilization mechanism coupled to the update mechanism for determining counter information stored by at least one of the counter bank portion, the overflow buffer portion and the secondary storage portion without substantially delaying updating by the update mechanism by communicating with the at least one of the counter bank portion, the overflow buffer portion, and the secondary storage portion by bypassing communication with the update mechanism.

2. A counter updating system according to claim 1, wherein the update mechanism comprises:
   a programmable gate array implementing a finite state machine.

3. A counter updating system according to claim 1, wherein the counter utilization mechanism comprises a host processor hosting the update mechanism.

4. A counter updating system according to claim 3, wherein the update mechanism is coupled to the host processor via a host system communication coupling and the update mechanism is coupled to the counter system portion via a separate counter system communication coupling.

5. A counter updating system according to claim 1, wherein the real-time update interval corresponds to a counter system update interval of the counter utilization mechanism minus a counter update jitter of the counter utilization mechanism attributable to counter utilization mechanism latency.

6. A counter updating system according to claim 1, wherein the real-time update interval is substantially equal to a shortest counter overflow rate of a counter system portion.

7. A counter updating system according to claim 1, wherein the real-time update interval is shorter than an update interval if conducted by the counter utilization mechanism, thereby enabling a counter width of a counter array including the counter array portion to be decreased.

8. A counter updating system according to claim 1, wherein the at least one substantially real-time update interval includes a first time interval for updating the counter bank portion and a second time interval for updating the secondary storage portion.

9. A counter updating method, comprising:
- updating, by an update mechanism, a counter system for counting a number of events that occur for communication of packets through a network device, the updating including updating a counter bank portion, updating an overflow buffer portion if the counter bank portion updating causes a counter overflow, and updating a secondary storage portion with values corresponding to the counter bank portion if the overflow buffer portion is not empty; and
- if a request for counter value information is received from a different counter utilization mechanism then
- determining counter information stored by at least one of the counter bank portion, the overflow buffer portion and the secondary storage portion without substantially delaying updating by the update mechanism by communicating with the at least one of the counter bank portion, the overflow buffer portion, and the secondary storage portion by bypassing communication with the update mechanism; and
- providing the counter information to the counter utilization mechanism.

10. A counter updating method according to claim 9, wherein the request directly accesses at least one of the counter bank portion, the overflow buffer portion and the secondary storage portion.

11. A counter updating system according to claim 9, wherein the request is received by the update mechanism, wherein the update mechanism accesses at least one of the counter bank portion, the overflow buffer portion and the secondary storage portion.

12. A counter updating system according to claim 9, wherein the request is received by the update mechanism via a system bus of the counter utilization mechanism.

13. A counter updating system according to claim 9, wherein the updating is conducted according to a substantially real time update interval.

14. A counter updating system according to claim 9, wherein the real-time update interval is substantially equal to a shortest counter overflow rate of a counter system portion.

15. A counter updating system according to claim 9, wherein the updating is conducted according to a first time interval for updating the counter bank portion and a second time interval for updating the secondary storage portion.

16. A machine-readable storage medium having stored thereon instructions for causing a correspondence system to perform the steps of:
- updating, by an update mechanism, a counter system for counting a number of events that occur for communication of packets through a network device, the updating including updating a counter bank portion, updating an overflow buffer portion if the counter bank portion updating causes a counter overflow, and updating a secondary storage portion with values corresponding to the counter bank portion if the overflow buffer portion is not empty; and
- if a request for counter value information is received from a different counter utilization mechanism then
- determining counter information stored by at least one of the counter bank portion, the overflow buffer portion and the secondary storage portion without substantially delaying updating by the update mechanism by communicating with the at least one of the counter bank portion, the overflow buffer portion, and the secondary storage portion by bypassing communication with the update mechanism; and
- providing the counter information to the counter utilization mechanism.

17. A counter updating system according to claim 1, wherein the counter utilization mechanism comprises a host processor hosting the update mechanism.

18. A counter updating system according to claim 17, wherein the update mechanism is coupled to the host processor via a host system communication coupling and the update mechanism is coupled to the counter system portion via a separate counter system communication coupling.

19. A counter updating system according to claim 1, wherein the real-time update interval corresponds to a counter system update interval of the counter utilization mechanism minus a counter update jitter of the counter utilization mechanism attributable to counter utilization mechanism latency.

20. A counter updating system according to claim 1, wherein the real-time update interval is substantially equal to a shortest counter overflow rate of a counter system portion.

21. A counter updating system according to claim 1, wherein the real-time update interval is shorter than an update interval if conducted by the counter utilization mechanism, thereby enabling a counter width of a counter array including the counter array portion to be decreased.

22. A counter updating system according to claim 1, wherein the at least one substantially real-time update interval includes a first time interval for updating the counter bank portion and a second time interval for updating the secondary storage portion.

23. A counter updating method, comprising:
- updating means, by an update mechanism, a counter system for counting a number of events that occur for communication of packets through a network device, the updating including updating a counter bank portion, updating an overflow buffer portion if the counter bank portion updating causes a counter overflow, and updating a secondary storage portion with values corresponding to the counter bank portion, and an overflow buffer portion if the overflow buffer is not empty; and
- means for determining if a request or counter value information is received from a different counter utilization mechanism;
- means for determining counter information stored by at least one of the counter bank portion, the overflow buffer portion and the secondary storage portion without substantially delaying updating by the update mechanism by communicating with the at least one of the counter bank portion, the overflow buffer portion, and the secondary storage portion by bypassing communication with update mechanism if a request for counter value information is received from a different counter utilization mechanism; and
- means for providing the counter information to the counter utilization mechanism if a request for counter value information is received from a different counter utilization mechanism.

* * * * *